(12) United States Patent
Ito et al.

(10) Patent No.: US 11,719,333 B2
(45) Date of Patent: Aug. 8, 2023

(54) LOAD DRIVE SYSTEM

(71) Applicant: DENSO CORPORATION, Kariya (JP)

(72) Inventors: Akito Ito, Kariya (JP); Yusuke Takahashi, Kariya (JP); Keisuke Atsumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 17/558,695

(22) Filed: Dec. 22, 2021

(65) Prior Publication Data

US 2022/0221049 A1 Jul. 14, 2022

(30) Foreign Application Priority Data

Jan. 8, 2021 (JP) .................................. 2021-002301

(51) Int. Cl.
| | | |
|---|---|---|
| *F16H 61/12* | (2010.01) | |
| *F16H 61/32* | (2006.01) | |
| *B60R 16/023* | (2006.01) | |
| *F16H 61/00* | (2006.01) | |

(52) U.S. Cl.
CPC ........... *F16H 61/32* (2013.01); *B60R 16/023* (2013.01); *F16H 61/12* (2013.01); *F16H 2061/005* (2013.01); *F16H 2061/1212* (2013.01); *F16H 2061/1268* (2013.01)

(58) Field of Classification Search
CPC ............. F16H 61/12; F16H 2061/1212; B60R 16/023
See application file for complete search history.

(56) References Cited

U.S. PATENT DOCUMENTS

| | | | | |
|---|---|---|---|---|
| 5,305,215 A | * | 4/1994 | Brekkestran | ........... B60W 10/11 477/110 |
| 2005/0021721 A1 | * | 1/2005 | Takahashi | .......... H04N 1/32662 709/223 |
| 2005/0203646 A1 | | 9/2005 | Makino et al. | |
| 2012/0253586 A1 | * | 10/2012 | Sakakibara | ............ G07C 5/085 701/29.2 |
| 2015/0019897 A1 | | 1/2015 | Horihata | |
| 2015/0191135 A1 | | 7/2015 | Ben Noon et al. | |
| 2015/0191136 A1 | | 7/2015 | Ben Noon et al. | |
| 2015/0191151 A1 | | 7/2015 | Ben Noon et al. | |

(Continued)

FOREIGN PATENT DOCUMENTS

| | | |
|---|---|---|
| JP | 2013-024080 A | 2/2013 |
| JP | 2019-218773 A | 12/2019 |

*Primary Examiner* — Edwin A Young
(74) *Attorney, Agent, or Firm* — Posz Law Group, PLC

(57) ABSTRACT

A load drive system, capable of providing certainty about instructions transmitted from a load control device to a load drive device as well as suppressing an increase of processing load, includes an ECU, a drive device, a communication bus to which the ECU and the drive device are connected, and a third signal line different from the communication bus connecting the ECU and the drive device. The ECU generates a frame including a drive instruction message, and transmits the message to the drive device via the communication bus. The drive device receives the frame via the communication bus, and extracts the drive instruction message from data of data field in the received frame. The drive device converts the drive instruction message into a load drive signal, and notifies the converted load drive signal to the ECU via the third signal line.

15 Claims, 22 Drawing Sheets

(56) References Cited

U.S. PATENT DOCUMENTS

| | | |
|---|---|---|
| 2015/0195297 A1 | 7/2015 | Ben Noon et al. |
| 2016/0359434 A1 | 12/2016 | Numata et al. |
| 2017/0259761 A1 | 9/2017 | Ben Noon et al. |
| 2017/0341604 A1 | 11/2017 | Ben Noon et al. |
| 2017/0341605 A1 | 11/2017 | Ben Noon et al. |
| 2017/0355326 A1 | 12/2017 | Ben Noon et al. |
| 2018/0015888 A1 | 1/2018 | Ben Noon et al. |
| 2018/0029539 A1 | 2/2018 | Ben Noon et al. |
| 2018/0029540 A1 | 2/2018 | Ben Noon et al. |
| 2018/0213006 A1 | 7/2018 | Wakita et al. |
| 2019/0111863 A1 | 4/2019 | Ben Noon et al. |
| 2019/0263279 A1* | 8/2019 | Kyojo ................ B60L 58/20 |
| 2019/0386846 A1* | 12/2019 | Yamada ............ B60R 16/023 |
| 2020/0213149 A1 | 7/2020 | Takeuchi et al. |

* cited by examiner

|  | bit1 | bit2 | bit3 | bit4 |
|---|---|---|---|---|
| P | 1 | 0 | 0 | 0 |
| R | 0 | 1 | 1 | 1 |
| N | 0 | 1 | 1 | 0 |
| 1ST GEAR | 0 | 0 | 0 | 1 |
| 2ND GEAR | 0 | 0 | 1 | 0 |
| 3RD GEAR | 0 | 0 | 1 | 1 |
| 4TH GEAR | 0 | 1 | 0 | 0 |
| 5TH GEAR | 0 | 1 | 0 | 1 |

LOAD DRIVE SYSTEM

CROSS REFERENCE TO RELATED APPLICATION

The present application is based on and claims the benefit of priority of Japanese Patent Application No. 2021-002301, filed on Jan. 8, 2021, the disclosure of which is incorporated herein by reference.

TECHNICAL FIELD

The present disclosure generally relates to a load drive system.

BACKGROUND INFORMATION

In a comparative load drive system, a load control device instructs a load drive device of a load drive state via a communication bus. In such case, the load drive system may be tampered instructing the load drive device in response to a cyberattack or the like. In order to prevent such a situation, it is conceivable that the load drive system performs encryption or the like by communication from the load control device to the load drive device. However, the load drive system has a problem that the processing load of the load control device and the load drive device increases by performing encryption.

SUMMARY

It is an object of the present disclosure to provide a load drive system capable of confirming certainty of instructions from a load control device to a load drive device and suppressing an increase in processing load.

DETAILED DESCRIPTION

Figure 1:
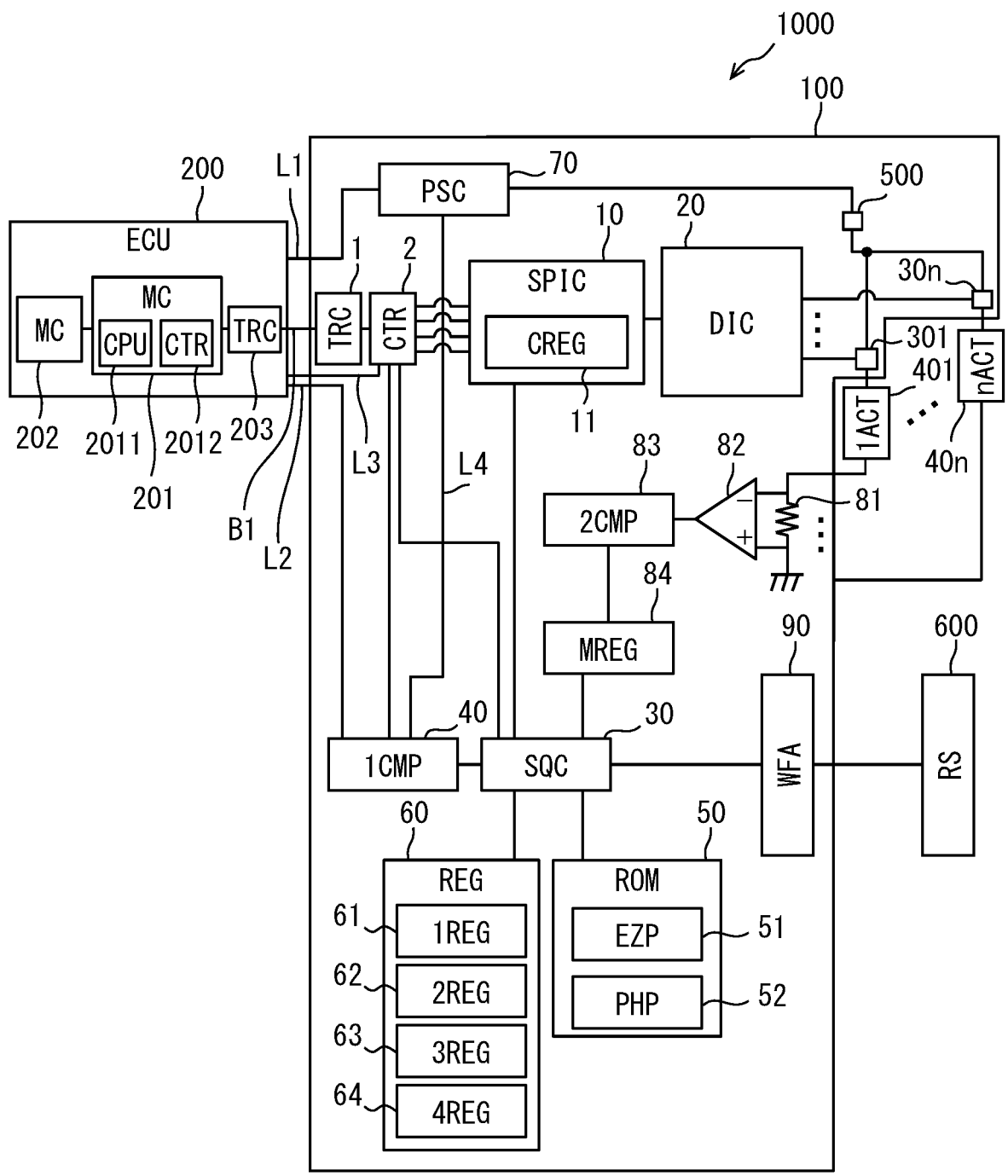
FIG. 1 is a circuit diagram showing a schematic configuration of a drive device in a first embodiment.

As follows, multiple embodiments for implementing the present disclosure will be described with reference to the drawings. In each embodiment, portions corresponding to those described in the preceding embodiment are denoted by the same reference numerals, and redundant descriptions may be omitted in some cases. In each of the embodiments, when only a part of the configuration is explained, the other part of the embodiment can be understood with reference to the previously-described other embodiment(s).

First Embodiment, FIGS. 1-15

A drive device 100, an ECU 200, and a load drive system 1000 of the present embodiment are described with reference to FIGS. 1 to 15. The load drive system 1000 can be applied to, for example, a circuit for driving a load mounted on a vehicle. In the following, an example applied to an automatic transmission of a vehicle will be described. However, the present disclosure is not limited to such example.

<Automatic Transmission>

A schematic configuration of the automatic transmission will be described. The automatic transmission includes, for example, a valve body, a transmission mechanism, an oil pump, a parking lock mechanism, and the like. The transmission mechanism has a plurality of friction elements including, for example, a clutch, a brake and the like. The transmission mechanism can change a transmission gear ratio in stages by selectively engaging each friction element.

A hydraulic circuit for adjusting the pressure of hydraulic oil supplied to the transmission mechanism is formed in the valve body. The valve body has multiple solenoid valves that regulate the hydraulic oil pumped from the oil pump and supply the hydraulic oil to the friction elements. The solenoid valve has a solenoid. The solenoid is sometimes referred to as a coil. The hydraulic oil is adjusted by controlling electrical conduction (i.e., energization) to the solenoid.

The solenoid valve corresponds to a load. Further, in the present embodiment, solenoid valves are adopted as a plurality of actuators 401 to 40n, which will be described later. Therefore, an electrical energization state, or energization state, of the load is the same as an electrical energization state of the solenoid valve (i.e., of the solenoid, in short). A linear solenoid valve can be used as the solenoid valve. Further, the actuators 401 to 40n are also describable collectively as an actuator 40n when it is not required to establish distinction among them.

When a parking range (i.e., a P range/position of the transmission) is selected, a parking lock mechanism sets a parking lock to lock a rotation of an output shaft (i.e., an axle) of the automatic transmission. When a shift range other than the parking range is selected from the state of the parking lock, the parking lock mechanism releases the parking lock. Accordingly, the output shaft is unlocked. However, the automatic transmission is not limited to the above configuration.

<Load Drive System>

As shown in FIG. 1, the load drive system 1000 includes at least a drive device 100, an ECU 200, a communication bus B1, and a third signal line L3. In the present embodiment, as an example, the load drive system 1000 having a first signal line L1 and a second signal line L2 and a fourth signal line L4 which are respectively different from the communication bus B1, is adopted. The first signal line is known as "a power supply signal line", the second signal line is known as "a comparator signal line", the third signal line is known as "a drive controller signal line", and the fourth signal line is known as "an internal signal line".

The load drive system 1000 controls the drive of the plurality of actuators 40n. Of the load drive system 1000, the drive device 100 is arranged/disposed on the valve body. That is, the drive device 100 has an integrated mechanical and electrical structure with the automatic transmission. The ECU 200 is mechanically separated from the automatic transmission. The automatic transmission including the valve body may also be regarded as a load. In FIG. 1, an energization path of the actuators 401 to 40n is simplified, or is schematically shown.

Note that n is a natural number of 2 or more. In the present embodiment, n=8 is adopted as an example. Therefore, in the present embodiment, an example in which a first actuator 401 to an eighth actuator 408 are energized and driven is adopted. Further, in the present embodiment, an example, in which the automatic transmission is switched between the first to fifth gears, the P range, an R range, and an N range (i.e., switched among eight positions in total) by controlling the drive of the first actuator 401 to the eighth actuator 408 is adopted.

However, the present disclosure is not limited to the above example. The present disclosure can be adopted even if the automatic transmission is switched between the first gear to the fifth gear by controlling the drive of a plurality of actuators 40n. Further, the present disclosure can also adopt an example in which the automatic transmission is switched among a P range, an R range, an N range, and a D range by controlling the drive of multiple actuators 40n. Further, as the actuators 40n, an ON-OFF solenoid valve can also be adopted.

Further, the load drive system 1000 controls the drive of the plurality of actuators 40n by controlling the plurality of drive switches 301 to 30n. The drive switches 301 to 30n are respectively provided in the electrical conduction paths (i.e., energization paths) of the corresponding actuators 40n. Therefore, in the present embodiment, as an example, a configuration in which a first drive switch 301 to an eighth drive switch 308 are provided is adopted. The drive switches 301 to 308 may also be collectively referred to as a drive switch 30n when it is not required to establish distinction among them, i.e., from each other. The drive switch 30n may also be included in a drive IC 20 described later.

When the drive switch 30n is turned ON, an electric current is supplied to the corresponding actuator 40n. When the drive switch 30n is turned OFF, the supply of the electric current to the corresponding actuator 40n is cut OFF or interrupted. In other words, each of the actuators 40n is electrically conducted or energized when the corresponding drive switch 30n is turned ON. Further, each of the actuators 40n is not electrically conducted, or de-energized, when the corresponding drive switch 30n is turned OFF.

Figure 2:
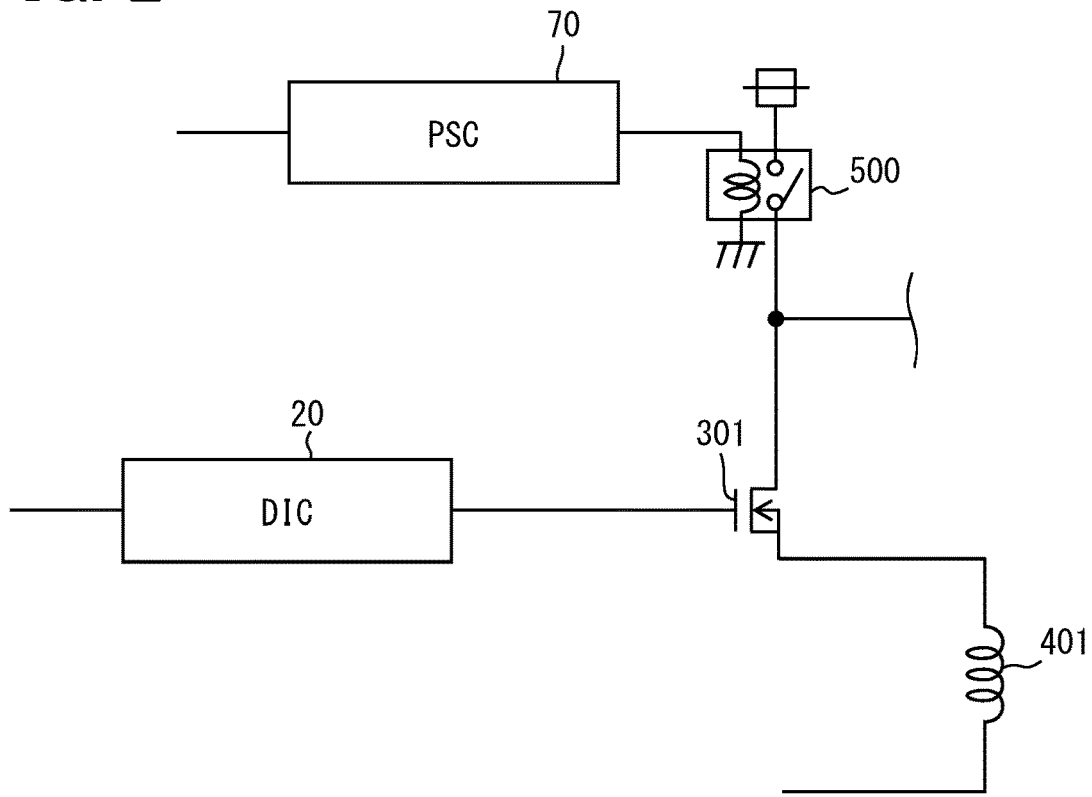
FIG. 2 is a circuit diagram showing a schematic configuration of a drive IC portion in the first embodiment.

As shown in FIGS. 1 and 2, the load drive system 1000 includes a power supply switch 500 (for turning ON OFF of supply of electric power from a power supply circuit or PSC 70 in FIG. 1). Further, the load drive system 1000 may include various sensors. However, the load drive system 1000 may not include the power supply switch 500 and the sensor, and the power supply switch 500 and the sensor may be arranged outside the load drive system 1000.

The power supply switch 500 is provided in an electrical conduction path to the actuators 40n. A single (i.e., common) power supply switch 500 is provided for all of the plurality of actuators 40n. When the power supply switch 500 is turned ON, each of the actuators 40n can receive a supply of electric current. When the power supply switch 500 is turned OFF, the supply of the electric current to each of the actuators 40n is interrupted.

The power supply switch 500 may be arranged on a high side, that is, on a power supply side, or on a low side, that is, on the ground (GND) side with respect to the plurality of actuators 40n. The power supply switch 500 of the present embodiment is arranged on the high side. As the power supply switch 500, a semiconductor switch such as a MOSFET can be adopted. Further, the power supply switch 500 is provided in the drive device 100.

The sensor outputs a signal (i.e., an electrical signal) indicating the state of the load. It can be said that the sensor detects the state of the automatic transmission including the valve body. In the present embodiment, as an example of the sensor, an example including a rotation sensor 600 (RS) is adopted. The rotation sensor 600 includes, for example, a sensor that outputs a signal indicating a rotation speed (e.g., a rotation number of an input shaft) on the input side of the automatic transmission and a sensor that outputs a signal indicating a rotation speed on the output side (e.g., a rotation number of an output shaft).

The ECU 200 and the drive device 100 are connected to a single/common communication bus B1. A device (not shown) other than the ECU 200 and the drive device 100 may also be connected to the communication bus B1. In the present embodiment, the ECU 200 and the drive device 100 are configured to be capable of communicating with each other via the communication bus B1 of the vehicle-mounted network conforming to CAN protocol. In other words, the ECU 200 and the drive device 100 communicate data with each other by a two-wire differential system via the communication bus B1. The communication bus B1 may also be referred to as a CAN bus. CAN is an abbreviation for Controller Area Network. CAN is a registered trademark.

In such manner, the ECU 200 and the drive device 100 communicate with each other via the communication bus B1 which serves as the CAN bus. Therefore, the ECU 200 and the drive device 100 can transmit and receive plural pieces of data substantially by/via one signal line. That is, the ECU 200 and the drive device 100 communicate with each other by a method different from Serial-Parallel Interface (SPI) communication or the like, which requires three or more copper wires.

In the load drive system 1000 of the present embodiment, the messages transmitted by the ECU 200 and the drive device 100 are prioritized in advance according to the importance and type of the messages. Then, when transmitting each message, priority information (e.g., ID code) indicating a priority of each message is transmitted first. At such timing, if the transmission of the priority information of a plurality of messages conflicts (e.g., collide with each other), the priority information is used for arbitration, and the priority information having a higher priority acquires the transmission right (e.g., right of way, or is transmitted first).

Further, the ECU 200 and the drive device 100 are connected by the first signal line L1, the second signal line L2, and the third signal line L3. Unlike the CAN bus, the signal lines L1 to L3 are not for transmission or reception of the above message. The signal lines L1 to L3 are, respectively, a copper wire used in SPI (Serial Peripheral Interface) communication, a copper wire used in serial communication without parallel conversion, and the like. Therefore, the ECU 200 and the drive device 100 can transmit and receive signals without going through a CAN transceiver 203, which is described later.

When performing SPI communication via the signal lines L1 to L3, the ECU 200 and the drive device 100 acquire signals by transmitting and receiving serial data and converting the received serial data into parallel data. Further, when the ECU 200 and the drive device 100 perform serial communication without parallel conversion via the signal lines L1 to L3, the ECU 200 and the drive device 100 acquire a signal by detecting the level of the terminal to which the signal lines L1 to L3 are respectively connected.

The first signal line L1 connects the ECU 200 and a power supply circuit 70 (PSC). The second signal line L2 connects the ECU 200 and a first comparator 40 (1CMP). The third signal line L3 connects the ECU 200 and a CAN controller 2 (CTR).

<ECU>

The ECU 200 corresponds to a load control device (or simply a control device). That is, the ECU 200 is a control device provided outside the drive device 100. The ECU 200 includes a first microcontroller 201 (MC) and a second microcontroller 202 (MC). Further, the ECU 200 includes a CAN transceiver 203 (TRC) for performing communication via the communication bus 131.

The first microcontroller 201 is a microcontroller provided with a CPU 2011, a CAN controller 2012, a ROM, a RAM, a register, and the like. In the first microcontroller 201, the CPU 2011 executes various controls according to a control program stored in advance in the ROM while using the temporary storage function of the RAM or the register. The CPU 2011 executes control using data acquired from outside the ECU 200, for example, a detection signal of a sensor. The CPU 2011 of the present embodiment controls each of the actuators 40n, which eventually is, a control of the automatic transmission.

The CPU 2011 sets a shift range or a gear of the automatic transmission. The CPU 2011 instructs the drive device 100 of a shift range or a gear. The CPU 2011 instructs the drive device 100 of change of the shift range by outputting data indicating a load drive signal indicating the shift range. The data indicating the load drive signal is information indicating a drive state of the load. The data indicating a load drive signal corresponds to drive information. Hereinafter, a message including data indicating a load drive signal may be referred to as a drive instruction message.

The drive instruction message includes a signal (i.e., a value) indicating an energization state (i.e., a drive state) of each of the actuators 40n. That is, it can be said that a drive instruction message includes a signal instructing an energization state individually corresponding to each of the actuators 40n. Further, it can be said that a drive instruction message includes a signal instructing a drive state of each of the actuators 40n.

Note that the CPU 2011 may execute a predetermined calculation to set a target current value. The target current value is a current value of electric current that should be passed on to each of the actuator 401 to 40n in order to bring each of the actuators 40n into a target state. The first microcontroller 201 acquires a state of the automatic transmission and calculates a target oil pressure which is a required value of an output oil pressure of each of the actuators 40n. The first microcontroller 201 calculates the target oil pressure based on, for example, the rotation speed on the input side and the rotation speed on the output side of the automatic transmission. The first microcontroller 201 sets a target current value based on the calculated target oil pressure. The relationship between the target oil pressure and the target current value is predetermined as, for example, a map or a function. The ECU 200 instructs the drive device 100 of the target current value.

The CPU 2011 may set a duty ratio based on the state of the automatic transmission. The first microcontroller 201 sets the duty ratio in order to suppress current fluctuations such as overshoot and current ripple at an initial stage of shifting. The duty ratio is the duty ratio of a PWM signal output to a gate of the drive switch 30n, which is described later.

The first microcontroller 201 sets a duty ratio based on, for example, at least one of the pressure of the hydraulic oil in the hydraulic circuit, temperature of the hydraulic oil, and an actual current value flowing through each of the actuators 40n. The ECU 200 instructs the drive device 100 of the duty ratio. The ECU 200 may instruct a duty ratio during a period when an electric power of the ECU 200 is turned ON, or may instruct a duty ratio only during a temporary period, e.g., for a short time, such as an initial stage of gear shifting.

The CPU 2011 determines whether or not an abnormality has occurred based on the state of the automatic transmission. The first microcontroller 201 compares, for example, a pressure of the hydraulic oil with an oil pressure threshold value, and determines whether or not an abnormality has occurred. The first microcontroller 201 compares, for example, temperature of the hydraulic oil with a temperature threshold value, and determines whether or not an abnormality has occurred.

When it is determined that an abnormality has occurred, the ECU 200 outputs an emergency instruction to the drive device 100 in order to bring all the actuators 40n into a predetermined abnormality handling state. As an emergency instruction, the ECU 200 of the present embodiment outputs an emergency interruption instruction to the drive device 100 in order to interrupt the energization of all the actuators 40n. Note that the CPU 2011 may output an emergency interruption instruction when an abnormal signal is input from the drive device 100. In such case, the CPU 2011 receives an input of an abnormal signal via, for example, the first signal line L1.

By the way, as is described later, when an abnormal signal is input from the drive device 100, the communication bus B1 may possibly be under an attack from an outside. That is, when an emergency interruption instruction is transmitted via the communication bus B1, such an emergency interruption instruction may possibly be tampered. Therefore, even if the CPU 2011 transmits an emergency interruption instruction via the CAN transceiver 203, the emergency interruption instruction may be not receivable by the drive device 100.

Therefore, it may be preferable that the CPU 2011 outputs an emergency interruption instruction via the first signal line L1, i.e., without going through the CAN transceiver 203. As a result, the CPU 2011 can reliably output an emergency interruption instruction to the drive device 100.

The first microcontroller 201 has a built-in CAN controller 2012 (CTR 2012 in FIG. 1) for transmitting and receiving messages via the communication bus B1. The CAN controller 2012 executes communication control according to the CAN protocol. The CAN controller 2012 executes, for example, transmission control, reception control, and arbitration control.

The CAN transceiver 203 (TRC in FIG. 1) is electrically connected to the CAN controller 2012 and also electrically connected to the communication bus B1. The CAN transceiver 203 makes it possible to transmit a message in both directions between the communication bus B1 and the CAN controller 2012 by bi-directionally converting the electrical characteristics between the communication bus B1 and the CAN controller 2012. For example, by converting a bus level signal of the communication bus B1 into a digital signal that can be handled by the CAN controller 2012, a dominant and a recessive are made recognizable. That is, the CAN controller 2012 is connected to the communication bus B1 via the CAN transceiver 203 so that messages can be transmitted and received to and from the communication bus B1.

The CAN controller 2012 has a message box for storing messages (not shown in the drawing). The CAN controller 2012 has a message box for transmission and a message box for reception. The CAN controller 2012 sequentially stores, in the message box, messages for transmission acquired via a communication interface. The CAN controller 2012 transmits (i.e., performs a transmission process for) the stored messages according to the priority of the ID code of the respective, stored messages. The CAN controller 2012 generates a frame based on the message stored in the message box and transmits the frame to the communication bus B1 via the CAN transceiver 203.

The CPU 2011 stores, for example, a drive instruction message in a message box for transmission of the CAN controller 2012. In such case, the CAN controller 2012 generates a frame including a drive instruction message and transmits the frame to the communication bus B1 via the CAN transceiver 203. Note that the CAN controller 2012 generates a frame including a drive instruction message in a data field. In such manner, the drive instruction message is arranged in the data field of a frame and is transmitted. Therefore, the drive instruction message is one of the CAN message data.

The CAN controller 2012 receives a frame from the communication bus B1 via the CAN transceiver 203, extracts a message or the like, and sequentially stores the message or the like in the message box. The CAN controller 2012 outputs the received message to a transmission target according to the priority of the ID code. The CAN controller 2012 arbitrates transmission rights (e.g., bit-wise non-destructive arbitration) when frames collide on the communication bus B1. The CAN controller 2012 also detects and notifies errors that occur in connection with the transmission and reception of frames. The CAN transceiver 203 and the CAN controller 2012 may be respectively referred to as a control-side communication unit.

The ECU 200 may further include the second microcontroller 202 as shown in FIG. 1. The second microcontroller 202 monitors whether the first microcontroller 201 is operating normally. The first microcontroller 201 may be referred to as a main microcontroller, and the second microcontroller 202 may be referred to as a monitoring microcontroller. The second microcontroller 202 monitors, for example, whether the first microcontroller 201 has a watchdog abnormality, a communication abnormality, or an abnormality of a calculation function. In addition to the monitoring function described above, the second microcontroller 202 may have a function of assisting a control executed by the first microcontroller 201. The second microcontroller 202 may execute a control different from that of the load drive system 1000. The second microcontroller 202 may also have a built-in CAN controller (not shown) and may be configured to transmit and receive messages via the communication bus B1.

In the present embodiment, monitoring means of the first microcontroller 201 is configured as the second microcontroller 202, and the microcontrollers 201 and 202 mutually monitor whether or not they are operating normally. The monitoring means of the first microcontroller 201 is not limited to the second microcontroller 202. A monitoring IC may be provided instead of having the second microcontroller 202 as monitoring means. The ECU 200 may be configured not to include monitoring means such as the second microcontroller 202.

<Configuration of Drive Device>

The drive device 100 is described. In FIG. 2, for convenience, only a portion corresponding to one actuator, i.e., the actuator 401, is shown.

The drive device 100 corresponds to a load drive device. The drive device 100 is a circuit that energizes and drives (i.e., drives by energizing) a plurality of actuators 40n. Further, the drive device 100 energizes and drives a plurality of actuators 40n by controlling a plurality of drive switches 30n. Unlike the ECU 200, the drive device 100 does not include a microcontroller. That is, the drive device 100 energizes and drives a plurality of actuators 40n by hardware logic.

The drive device 100 includes a CAN transceiver 1 (TRC), a CAN controller 2 (CTR), an SPI circuit 10 (SPIC) including a control register 11 (CREG), a drive IC 20 (DIC), the first comparator 40, and a ROM 50, as its main components. Further, the drive device 100 includes a sequence circuit 30 (SQC), a register unit 60 (REG), the power supply circuit 70 (PSC), a current detection resistor 81, an amplifier 82, a second comparator 83 (2CMP), a monitor register 84 (MREG), a waveform analysis circuit 90 (WFA), and the like.

The CAN transceiver 1 is electrically connected to the CAN controller 2 and also electrically connected to the communication bus B1. The CAN transceiver 1 makes it possible to transmit a message in both directions between the communication bus B1 and the CAN controller 2 by bi-directionally converting the electrical characteristics between the communication bus B1 and the CAN controller 2. The CAN controller 2 is connected to the communication bus B1 via the CAN transceiver 1 so that messages can be transmitted and received to and from the communication bus B1.

The CAN controller 2 has a message box for storing messages (not shown in the drawing). The CAN controller 2 has a message box for transmission and a message box for reception. The CAN controller 2 sequentially stores, in the message box, transmission messages acquired via a communication interface. The CAN controller 2 performs transmission process for the stored message according to the priority of the ID code of the messages. The CAN controller 2 generates a frame based on the message stored in the message box and transmits the frame to the communication bus B1 via the CAN transceiver 1.

The CAN controller 2 receives frames from the communication bus B1 via the CAN transceiver 1 and sequentially stores them in the message box. The CAN controller 2 outputs the received message to the transmission target according to the priority of the ID code. The CAN controller 2 arbitrates the transmission right (e.g., bit-wise non-destructive arbitration) when frames collide on the communication bus B1. The CAN controller 2 also detects and notifies errors that occur in connection with the transmission and reception of frames.

More specifically, when the CAN controller 2 receives, for example, a frame including a drive instruction message, the CAN controller 2 stores the data in the data field of the received frame in the message box for reception (i.e., hereafter, the reception message box). Further, the CAN controller 2 retrieves, i.e., takes out, data from the reception message box. Then, the CAN controller 2 extracts the drive instruction message from the retrieved data and converts the drive instruction message into a load drive signal. The load drive signal corresponds to (i) the drive information or (ii) a signal corresponding to the drive information.

Note that the CAN controller 2 may have a register for SPI communication. In such case, the CAN controller 2 may move/copy the drive instruction message from the message box, and may store such a drive instruction message in a register or the like. In such manner, the CAN controller 2 can temporarily store the drive instruction message transmitted from the ECU 200.

The load drive signal stored in the CAN controller 2 includes, for example, 1 as a signal instructing energization and 0 as a signal instructing non-energization. Therefore, the load drive signal can be represented by 0 and 1. In the present embodiment, as shown in an upper box of FIG. 3, an 8-bit load drive signal is adopted as an example. However, the present disclosure is not limited to such configuration, and any multi-bit load drive signal can be adopted.

The load drive signal is a signal that controls the drive of a plurality of actuators 40*n*. Therefore, the load drive signal stored in the CAN controller 2 can also be understood as a control pattern. The control pattern stored in the CAN controller 2 is a current (i.e., presently-used) control pattern that controls the drive of a plurality of actuators 40*n*. Therefore, the control pattern stored in the CAN controller 2 can also be understood as an update value of the control pattern.

Further, an update value of the control pattern regarding each of the actuators 40*n* corresponds to a drive state after a transition from one drive state to the other (i.e., a next drive state), which may also be mentioned as a drive transition, in the following. Therefore, the drive state of each of the actuators 40*n* changes/transitions when the control pattern is switched from a previous value to the update value. The previous value of the control pattern is described later in detail.

Figure 3:
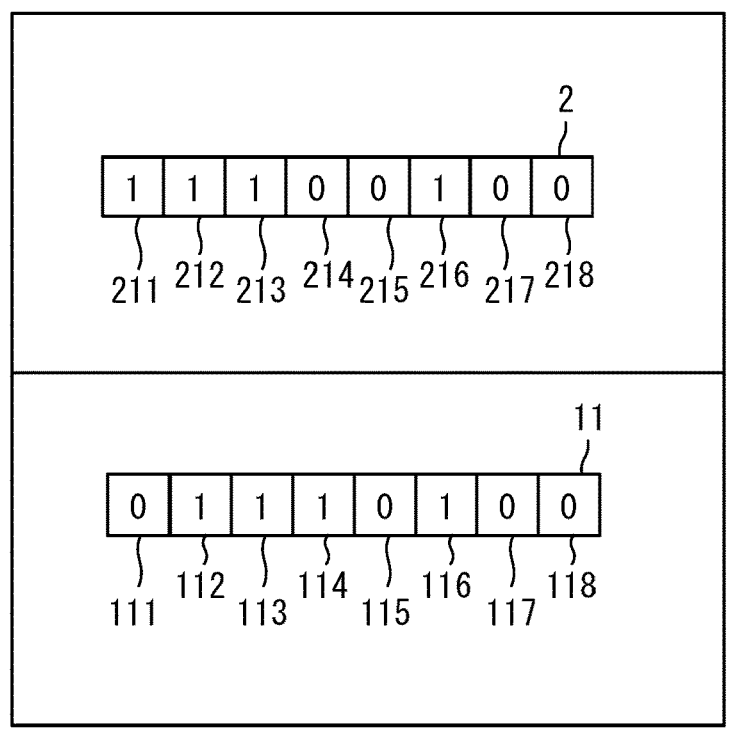
FIG. 3 is an image schematic diagram showing a schematic configuration of a control register in the first embodiment.

As shown in the upper box of FIG. 3, in the present embodiment, as an example, the CAN controller 2 in which 11100100 (first gear) is written as an update value of the control pattern is adopted. Further, the update value of the control pattern is compared with a transition prohibition pattern 52 which serves as a transition determination value. Therefore, the control pattern can also be understood as a comparison pattern (or as a data/bit pattern for comparison). Further, the transition prohibition pattern 52 can also be understood as a determination pattern (or as a data/bit pattern for determination of transition).

A first bit 211 in the upper box of FIG. 3 corresponds to the first actuator 401. A second bit 212 corresponds to the second actuator 402. A third bit 213 corresponds to the third actuator 403. A fourth bit 214 corresponds to the fourth actuator 404. A fifth bit 215 corresponds to the fifth actuator 405. A sixth bit 216 corresponds to the sixth actuator 406. A seventh bit 217 corresponds to the seventh actuator 407. An eighth bit 218 corresponds to the eighth actuator 408.

Note that, in the present embodiment, the update value of the control pattern itself is adopted as a correlated drive state of each of the actuators 40*n* correlated with the load drive signal received by the CAN transceiver 1 and the CAN controller 2. The correlated drive state can be regarded as a drive state after a transition from some other drive state. Therefore, the correlated drive state can also be understood as the next drive state.

Further, the CAN controller 2 outputs the update value of the control pattern to the SPI circuit 10. At such timing, the CAN controller 2 outputs the control pattern to the SPI circuit 10 only when the update value of the control pattern is normal. That is, when a normal signal is output from the first comparator 40 described later, the CAN controller 2 outputs an update value of the control pattern to the SPI circuit 10. Further, when an abnormal signal is output from the first comparator 40, the CAN controller 2 discards the current value of the control pattern without outputting it to the SPI circuit 10.

The SPI circuit 10 (SPIC) is connected to the CAN controller 2, the drive IC 20, the sequence circuit 30, and the like. The SPI circuit 10 has the control register 11 (CREG). The control register 11 can also be understood as a control storage unit. SPI is an abbreviation for "Serial Peripheral Interface."

The control register 11 stores, i.e., memorizes, the control pattern output from the CAN controller 2. As is described later, in the drive device 100, the drive IC 20 controls the drive of each of the actuators 40*n* according to the control pattern stored in the control register 11. It can then be said that the control register 11 stores a control pattern already used by the drive IC 20 for drive control. Therefore, the control pattern stored in the control register 11 can also be understood as a previous value of the control pattern. That is, the previous value of the control pattern corresponds to a current drive state, in which each of the respective actuators 40*n* is currently put. In such manner, the SPI circuit 10 acquires the previous value of the control pattern.

As illustrated in a lower box of FIG. 3, in the present embodiment, an example of the control register 11 having data '01110100' (fourth gear) written therein as a previous value of the control pattern is shown. The control register 11 has eight address bits 111 to 118 corresponding to addresses of respective actuators 40n. In the control register 11, a signal indicating a drive state of each of the actuators 40n in the load drive signal is written in a relevant address bit.

The first bit 111 in the lower box of FIG. 3 corresponds to the first actuator 401. The second bit 112 corresponds to the second actuator 402. The third bit 113 corresponds to the third actuator 403. The fourth bit 114 corresponds to the fourth actuator 404. The fifth bit 115 corresponds to the fifth actuator 405. The sixth bit 116 corresponds to the sixth actuator 406. The seventh bit 117 corresponds to the seventh actuator 407. The eighth bit 118 corresponds to the eighth actuator 408.

As shown in FIGS. 1 and 2, the drive IC 20 is connected to a plurality of drive switches 30n. The drive IC 20 controls a plurality of drive switches 30n according to the control pattern. That is, the drive IC 20 outputs a drive signal for individually turning ON/OFF each drive switch 30n according to the control pattern stored in the control register 11. Further, the drive IC 20 selectively turns ON/OFF a plurality of drive switches 301 to 308 according to the control pattern stored in the control register 11.

Note that FIG. 1 shows only one drive IC 20 for convenience. However, the drive device 100 includes a plurality of drive ICs 20 respectively connected to the corresponding drive switches 30n. That is, the drive device 100 includes the same number of drive ICs 20 as the number of drive switches 30n.

Therefore, each drive IC 20 turns ON/OFF the drive switch 30n connected to itself according to the value corresponding to the relevant drive IC 20 in the control pattern. For example, when the first drive IC 20 and the first drive switch 301 are connected, the first drive IC 20 turns ON and OFF the first drive switch 301 according to the value stored in the first bit 111 of the control register 11.

As the drive signal, a PWM signal can be adopted. In such case, the drive IC 20 can change electric currents flowing through the actuators 40n (that is, energization current) by changing a duty ratio of the PWM signal. PWM is an abbreviation for Pulse Width Modulation.

For example, when the control pattern is 11100100, the drive IC 20 turns ON the first drive switch 301 to the third drive switch 303 and the sixth drive switch 306. As a result, the drive IC 20 energizes the first actuator 401 to the third actuator 403 and the sixth actuator 406. At the same time, the drive IC 20 turns OFF the fourth drive switch 304, the fifth drive switch 305, the seventh drive switch 307, and the eighth drive switch 308. As a result, the drive IC 20 de-energizes the fourth actuator 404, the fifth actuator 405, the seventh actuator 407, and the eighth actuator 408.

Figure 4:
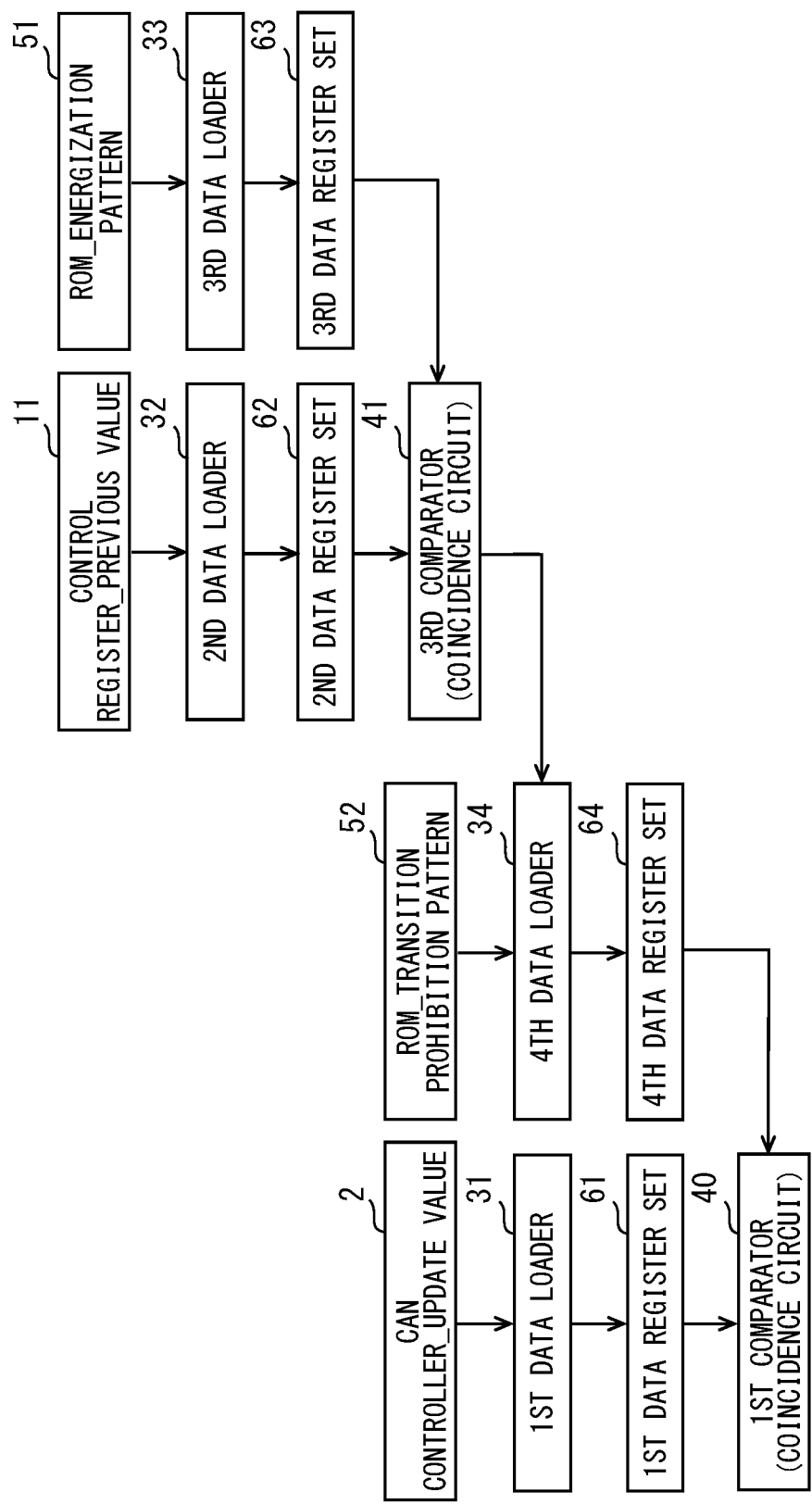
FIG. 4 is a block diagram showing an operation of a sequence circuit in the first embodiment.

As shown in FIG. 4, the sequence circuit 30 (SQC) includes a first data loader 31, a second data loader 32, a third data loader 33, a fourth data loader 34, a third comparator 41, and the like. Further, the sequence circuit 30 includes multiple switching elements and the like. The sequence circuit 30 operates in synchronization with a clock. The sequence circuit 30 operates to compare an update value of the control pattern with a determination pattern. Note, also see the discussion of FIG. 7 below for additional information about the third comparator 41.

Figure 5:
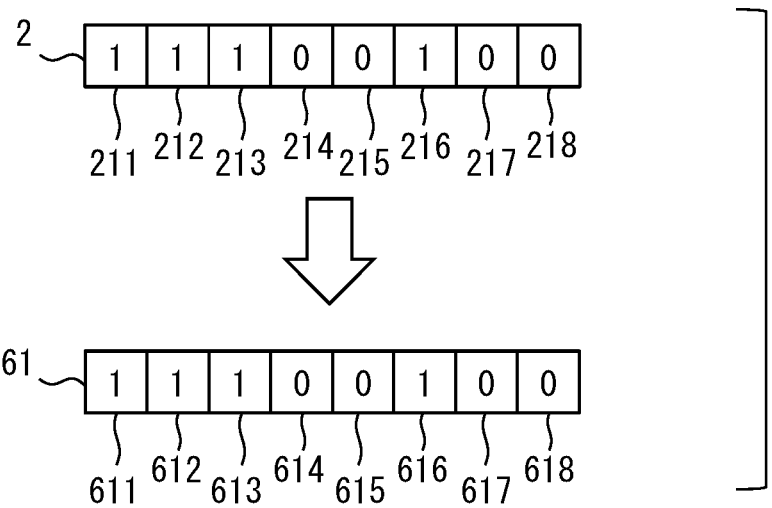
FIG. 5 is a schematic diagram showing a set operation of a control pattern (i.e., an update value) in the first embodiment.

As shown in FIG. 5, the first data loader 31 writes, to a first data register 61, an update value of the control pattern stored in the CAN controller 2. That is, the first data loader 31 copies a signal of each bit in the CAN controller 2, and writes it to each bit of the first data register 61.

Figure 6:
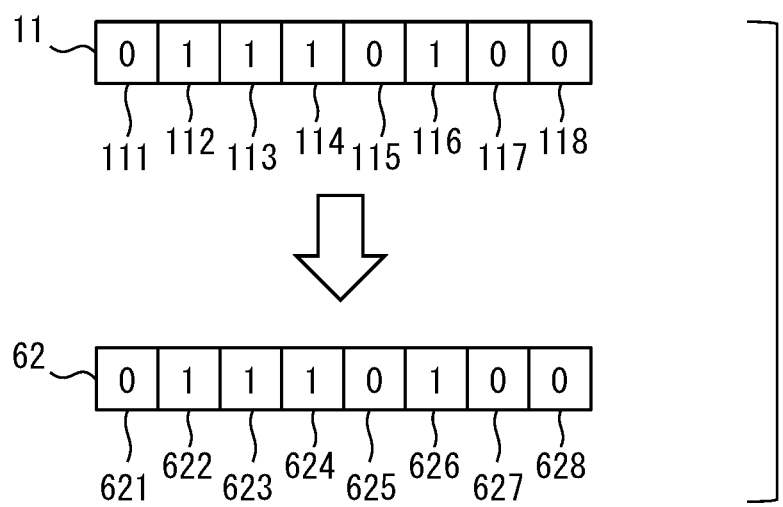
FIG. 6 is a schematic diagram showing a set operation of a control pattern (i.e., a previous value) in the first embodiment.

As shown in FIG. 6, the second data loader 32 writes, to a second data register 62, a previous value of the control pattern stored in the control register 11. That is, the second data loader 32 copies a signal of each bit in the control register 11 and writes it to each bit of the second data register 62.

Figure 7:
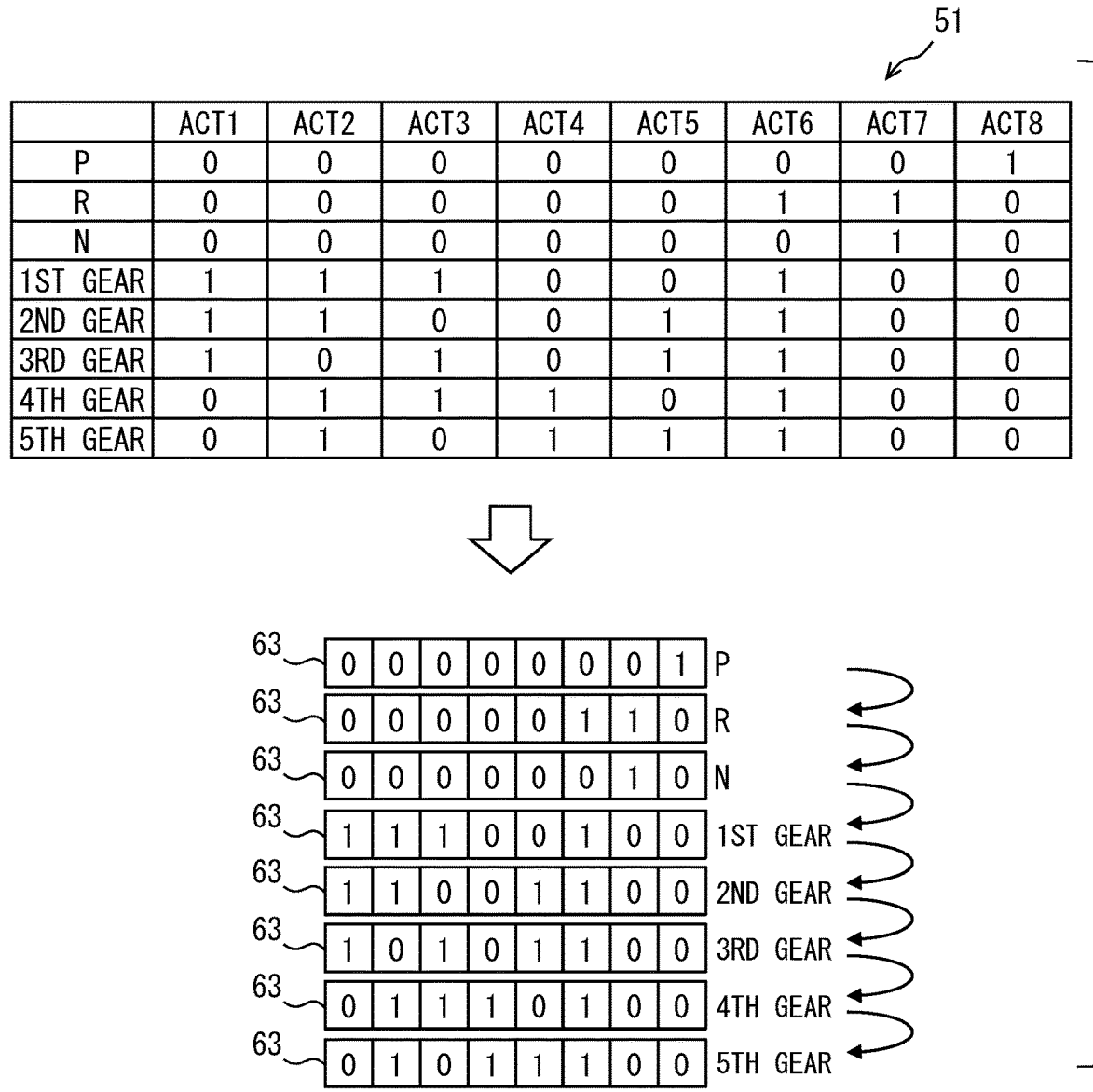
FIG. 7 is a schematic diagram showing a setting operation of an energization pattern in the first embodiment.

As shown in FIG. 7, the third data loader 33 writes a plurality of energization patterns 51 stored in the ROM 50 to a third data register 63 in order. That is, the third data loader 33 copies a signal of each bit in the energization pattern 51, and writes it to each bit of the third data register 63. The energization pattern 51 is described later in detail.

The third comparator 41 compares the control pattern set in the second data register 62 with the energization pattern 51 set in the third data register 63 in order (i.e., pattern by pattern). The third comparator 41 selects an energization pattern 51 that matches the previous value of the control pattern from among the plurality of energization patterns 51. Such a control is to select a transition prohibition pattern 52 that corresponds to the previous value of the control pattern. The third comparator 41 outputs a signal indicating an energization pattern 51 that matches the previous value of the control pattern.

It can also be understood that the third comparator 41 detects that the previous value of the control pattern is a control pattern indicating the fourth gear. Further, it can also be understood that the third comparator 41 determines a drive transition from one drive state indicated by the previous value of the control pattern to the other drive state indicated by the update value of the control pattern. In other words, the third comparator 41 (shown in FIG. 4, but not shown in FIG. 1) confirms that the stored previous value in control register 11 (in SPI circuit 10) is valid because it matches or is "coincident" with a known/recognized energization pattern in EZP 51 in ROM 50. The third comparator then passes this confirmed/matched/coincident previous value to the fourth data loader 34. The fourth data loader 34 uses this confirmed previous value to select and load transition prohibition patterns associated with the confirmed previous value. Finally, the first comparator 40 compares the update value against transition prohibition patterns (that are associated with the confirmed previous value).

If the comparator 40 determines that the update value is prohibited (matches a transition prohibited pattern), then the update value is an abnormal control pattern, and an abnormal signal is outputted. Optionally, this abnormal signal may be sent to the control device via second signal line L2, thus avoiding the potentially tampered/abnormal communication bus B1.

If the comparator 40 determines that the update value is permitted (not prohibited), then the update value is a normal control pattern.

Figure 8:
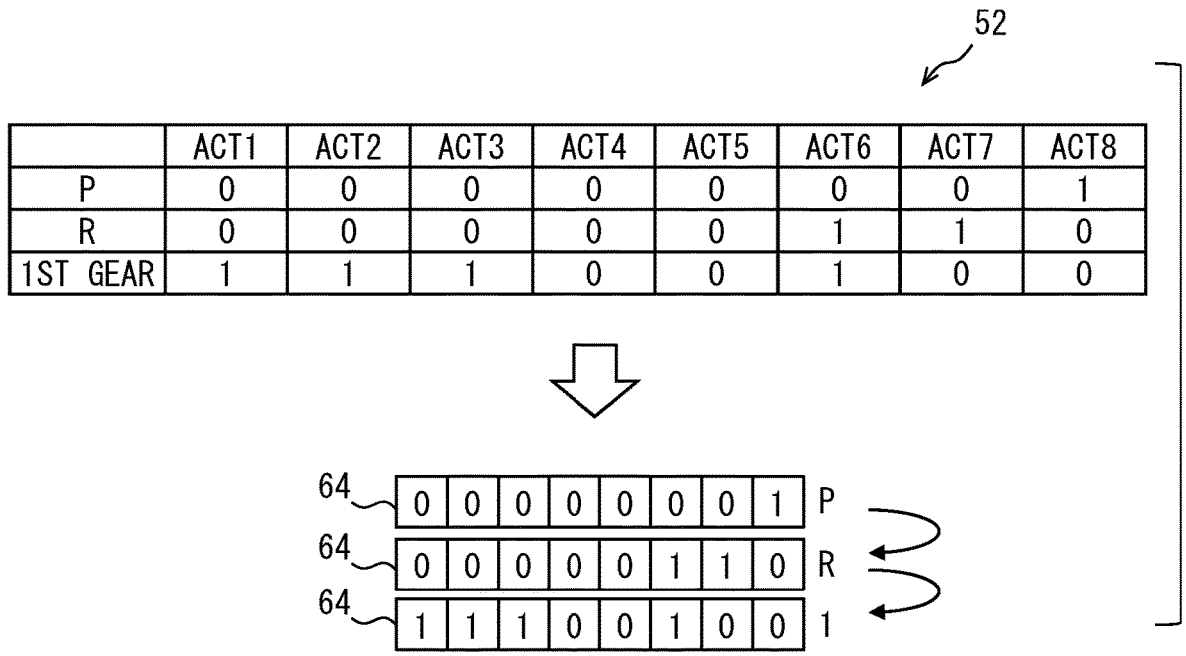
FIG. 8 is a schematic diagram showing a set operation of a transition prohibition pattern in the first embodiment.

As shown in FIG. 8, the fourth data loader 34 writes the transition prohibition pattern 52 stored in the ROM 50 to a fourth data register 64. The fourth data loader 34 writes the transition prohibition pattern 52 corresponding to a signal output from the third comparator 41 to the fourth data register 64. When there are a plurality of transition prohibition patterns 52, the fourth data loader 34 writes the transition prohibition pattern 52 to the fourth data register 64 in order (i.e., pattern by pattern). In other words, the fourth data loader 34 copies a signal of each bit in the transition prohibition pattern 52, and writes it to each bit of the fourth data register 64. In such manner, the fourth data loader 34 acquires the transition prohibition pattern 52 associated with the control pattern from the ROM 50.

In the present embodiment, the transition prohibition pattern 52 is adopted as a determination pattern. Note that the transition prohibition pattern 52 can also be understood as a transition determination value and a prohibition determination value. The transition prohibition pattern 52 is described later in detail.

The first comparator 40 (1CMP) is composed of an operational amplifier or the like. The first comparator 40 compares a transition prohibition pattern 52 with an update value of the control pattern. The first comparator 40 compares each signal of the transition prohibition pattern 52 with each signal in the update value of the control pattern in order. The first comparator 40 compares the transition prohibition pattern 52 with the update value of the control pattern, and determines whether or not the transition prohibition pattern 52 and the update value of the control pattern satisfy a predetermined correspondence relationship. Then, the first comparator 40 determines that the update value of the control pattern is abnormal when a predetermined correspondence relationship is satisfied.

As described above, in the present embodiment, the transition prohibition pattern 52 is adopted as the transition determination value. Therefore, the first comparator 40 determines that the predetermined correspondence relationship is satisfied when the transition prohibition pattern 52 and the update value of the control pattern match. Further, when the transition prohibition pattern 52 and the update value of the control pattern match, it can be understood that the update value of the control pattern is included in the transition prohibition pattern 52. On the other hand, the first comparator 40 determines that the predetermined correspondence relationship is not satisfied when the transition prohibition pattern 52 and the update value of the control pattern do not match.

The update value of the control pattern that matches the transition prohibition pattern 52 becomes a control pattern that indicates a drive transition from the current drive state to a prohibited drive state. Therefore, the update value of such control pattern is an abnormal control pattern. A cause of reception of an abnormal control pattern by the CAN controller 2 can be spoofing of a message or the like. That is, in the load drive system 1000, when the communication bus B1 is attacked and the load drive signal is falsified, that leads to a situation in which an abnormal control pattern is transmitted to the drive device 100, for example.

On the other hand, the update value of the control pattern that does not match the transition prohibition pattern 52 becomes a control pattern that instructs a drive transition from the current drive state to a non-prohibited drive state. Therefore, the update value of such control pattern is a normal control pattern.

Therefore, when the transition prohibition pattern 52 and the update value of the control pattern match, the first comparator 40 determines that the update value of the control pattern is abnormal. On the other hand, when the transition prohibition pattern 52 and the update value of the control pattern do not match, the first comparator 40 determines that the update value of the control pattern is normal.

Further, the first comparator 40 outputs different output signals, depending on whether or not the transition prohibition pattern 52 and the update value of the control pattern match. If they match, the first comparator 40 outputs an abnormal signal indicating that the update value of the control pattern is abnormal. The abnormal signal indicates (i) that the update value of the control pattern is abnormal and (ii) that the communication via the communication bus B1 may be abnormal.

On the other hand, if they do not match, the first comparator 40 outputs a normal signal indicating that the control pattern is normal. The abnormal signal and the normal signal are output to the CAN controller 2, the power supply circuit 70, the ECU 200, and the like. The normal signal indicates (i) that the update value of the control pattern is normal and (ii) that the communication via the communication bus B1 is normal.

The first comparator 40 notifies the CAN controller 2 that the update value of the control pattern is abnormal by outputting the abnormal signal to the CAN controller 2. The first comparator 40, by notifying the CAN controller 2 of the abnormality, instructs the CAN controller 2 to discard the update value of the control pattern. The first comparator 40 instructs that the actuator 40n be put in a power supply interrupted state, by an output of an abnormal signal to the power supply circuit 70 and/or the ECU 200. Note that when instructing to interrupt the power supply, the first comparator 40 may output an abnormal signal to at least one of the power supply circuit 70 and the ECU 200.

Further, the first comparator 40 instructs the CAN controller 2 to output an update value of the control pattern, by outputting a normal signal to the CAN controller 2. The first comparator 40, by outputting a normal signal to the power supply circuit 70 and/or the ECU 200, instructs that the actuator 40n be put in a power supplied state.

As described above, the communication bus B1 may be attacked from the outside. That is, when an abnormal signal or a normal signal is transmitted via the communication bus B1, those signals may be tampered or may be being already tampered. Therefore, even if the drive device 100 transmits an abnormal signal or a normal signal via the CAN transceiver 203, the ECU 200 may not be able to receive those signals.

Therefore, it may be preferable that the first comparator 40 outputs an abnormal signal or a normal signal to the ECU 200 via the second signal line L2. In such manner, the first comparator 40 can output an abnormal signal or a normal signal to the ECU 200 even if the communication bus B1 is under attack.

The ROM 50 stores an energization pattern 51 (EZP) and a transition prohibition pattern 52 (PHP). It can be understood that the ROM 50 has an energization pattern memory in which the energization pattern 51 is stored and a transition prohibition pattern memory in which the transition prohibition pattern 52 is stored. The ROM 50 can also be understood as a determination pattern storage unit.

Figure 9:
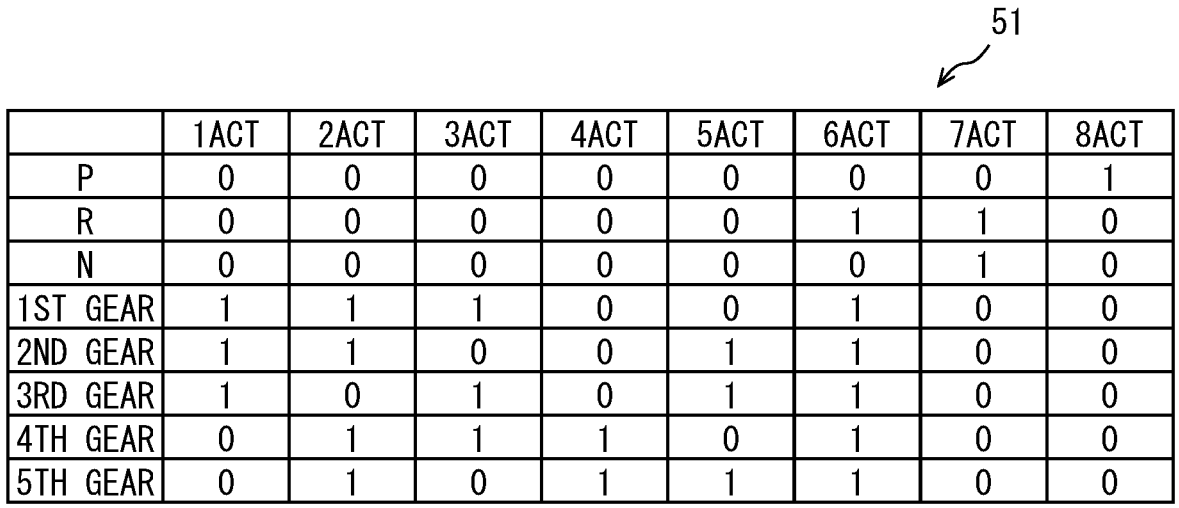
FIG. 9 is a schematic diagram showing a schematic configuration of an energization pattern in the first embodiment.

As shown in FIG. 9, the energization pattern 51 is a control pattern corresponding to all of the drive states of each of all actuators 40n. Therefore, the ROM 50 stores a plurality of energization patterns 51. Further, each energization pattern 51 includes a signal instructing a drive state of each of the actuators 40n. Further, each energization pattern 51 correlates with each state (i.e., one of eight states of first to fifth and P, R, N) of the automatic transmission. If the previous value of the control pattern and the update value of the control pattern are respectively normal, they are respectively one of the energization patterns 51. Note that, in FIG. 9 and other drawings, the actuators 401 to 408 are respectively shown as 1ACT to 8ACT.

Figure 10:
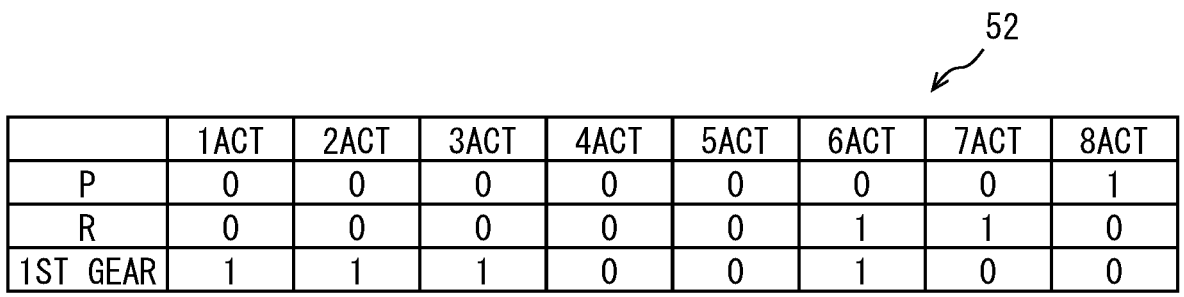
FIG. 10 is a schematic diagram showing a schematic configuration of a transition prohibition pattern in the first embodiment.

As shown in FIG. 10, the transition prohibition pattern 52 is an energization pattern 51 indicating a drive state for each of the actuators 40n. The transition prohibition pattern 52 is a value that correlates with a drive transition from the current drive state. The transition prohibition pattern 52 is a determination value for determining whether or not the update value of the control pattern is abnormal. The ROM 50 stores the control pattern and the transition prohibition pattern 52 in association with each other.

The transition prohibition pattern 52 indicates a prohibited drive state to which a drive transition from a drive state indicated by the previous value of the control pattern is prohibited. The transition prohibition pattern 52 can also be understood as an energization pattern 51 showing a drive transition that is an unfavorable/undesirable operation as (i.e., that may better not happen in) an automatic transmission.

In an example of FIG. 10, the transition prohibition pattern 52 associated with the control pattern indicating the fourth gear is shown. When the automatic transmission is in the fourth gear, downshifting to the first gear results in an unintended steep deceleration. In addition, the shift change to the R range is an unintended selection of a reverse gear. Then, the shift change to the P range leads to an unintended P (parking) lock. Therefore, as the control pattern corresponding to the fourth gear, energization patterns corresponding to the first gear, the R range, or the P range are respectively associated as the transition prohibition pattern. Unlike the control pattern, the transition prohibition pattern 52 is stored in the ROM 50 in advance.

The ROM 50 has address bits respectively corresponding to the actuator 401 to 408. In the ROM 50, a signal (i.e., a value) indicating a drive state to each of the actuators 401 to 408 in the transition prohibition pattern 52 is respectively written in the relevant address bit. In the present embodiment, an 8-bit control pattern is adopted as an example. Therefore, each transition prohibition pattern 52 has 8 bits, which is the same as the control pattern. Each transition prohibition pattern 52 includes 1 as a signal indicating energization and 0 as a signal indicating non-energization. Therefore, each transition prohibition pattern 52 can be represented by 0 and 1.

The ROM 50 may preferably be configured not to be accessible via the CAN controller 2. That is, the ROM 50 has a configuration that cannot be rewritten from the outside of the drive device 100 via the CAN controller 2. Further, it can also be understood that the ROM 50 is provided independently of the communication via the communication bus B1. Therefore, the energization pattern 51 and the transition prohibition pattern 52 are written in the ROM 50 at a factory, a dealer, or the like. By such configuration, the drive device 100 can prevent the energization pattern 51 and the transition prohibition pattern 52 from being unintentionally rewritten.

The register unit 60 (REG) includes the first data register 61 (1REG), the second data register 62 (2REG), the third data register 63 (3REG), and the fourth data register 64 (4REG). Values are set in each of the data registers 61 to 64 as described above.

As shown in FIGS. 1 and 2, the power supply circuit 70 is a circuit for switching ON/OFF of the power supply switch 500. The power supply circuit 70 switches the power supply state to the plurality of actuators 401 to 408 by turning the power supply switch 500 ON and OFF. The power supply circuit 70 (PSC) can also be understood as a power supply unit.

When an emergency interruption instruction is input from the ECU 200, the power supply circuit 70 outputs, for example, a signal indicating a turning OFF of the power supply switch 500. That is, the power supply circuit 70 puts each of the actuators 40n in a power supply interrupted state by turning OFF the power supply switch 500. Further, it can also be understood that the power supply circuit 70 turns OFF the power supply switch 500 in order to prevent each of the actuators 40n from being driven by an abnormal control pattern. On the other hand, when the update value of the control pattern is normal, the power supply circuit 70 turns ON the power supply switch 500 and sets the power supplied state for each of the actuators 40n.

The power supply circuit 70 may output a signal indicating that the power supply switch 500 is OFF when an abnormal signal is input from the first comparator 40. The emergency interruption instruction and the abnormal signal can also be understood as signals instructing the power supply switch 500 to be turned OFF.

The current detection resistor 81 constitutes a current detection unit together with the amplifier 82. The current detection unit is individually provided for each of the actuators 40n. Therefore, in the present embodiment, the drive device 100 is provided with eight current detection units. In FIG. 1, as a representative example, only a current detection unit corresponding to the first actuator 401 is shown.

Each current detection unit detects the electric current actually flowing through the corresponding actuator 40n. In other words, each current detection unit detects the drive state of the corresponding actuator 40n. Further, it can also be understood that each of the current detection units monitors the energization state of the corresponding actuator 40n.

In addition to the current detection resistor 81 and the amplifier 82, each of the current detection units may include a filter that removes/filters noise of a voltage amplified by the amplifier 82. The filter can include, for example, a resistor and a capacitor.

The current detection resistor 81 is connected in series with the actuator 401. The current detection resistor 81 is provided on a ground side (i.e., on a downstream side) with respect to the first actuator 401. The amplifier 82 amplifies a voltage, which is generated across the current detection resistor 81 and which is proportional to the electric current. Therefore, the amplifier 82 outputs a voltage signal proportional to (the magnitude of) the electric current flowing through the first actuator 401. Therefore, each of the current detection units outputs a voltage signal proportional to (the magnitude of) the electric current flowing through the corresponding actuator 40n.

The second comparator 83 (2CMP) is composed of an operational amplifier or the like. The second comparator 83 is individually provided for each of the actuators 40n. Further, the second comparator 83 is provided as a set with the current detection resistor 81 and the amplifier 82. In the present embodiment, eight second comparators 83 are provided in the drive device 100. In FIG. 1, as a representative example, only the second comparator 83 corresponding to the first actuator 401 is shown.

The second comparator 83 compares a voltage signal output by the amplifier 82 with a reference value. The second comparator 82 outputs a positive value when the voltage signal is higher than the reference value, and outputs a negative value when the voltage signal is lower than the reference value. That is, it can also be understood that the second comparator 83 outputs a monitor result indicating the energization state of each of the actuators 40n monitored by each of the current detection units. The second comparator 83 outputs a positive value, when, for example, the first actuator 401 is energized. Further, the second comparator 83 outputs a negative value, when, for example, the first actuator 401 is not energized.

Figure 11:
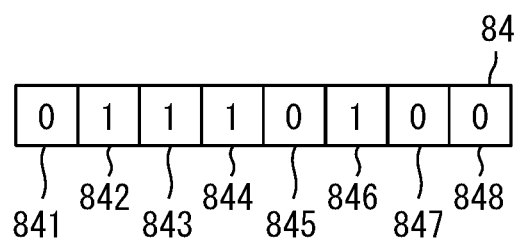
FIG. 11 is a schematic diagram showing a schematic configuration of a monitor register in the first embodiment.

As shown in FIG. 11, an output of each of the second comparators 83 is written to the monitor register 84 (MREG). That is, it can also be understood that the monitor register 84 stores a monitor pattern that is the result of monitoring of the energization state of each of the actuators 40n. The monitor pattern can be regarded as a current drive state. The monitor pattern can also be regarded as a correlated drive state. The monitor register 84 can also be understood as a monitor (pattern) storage unit. In FIG. 11, as an example, a monitor register 84 in which a monitor pattern indicating the fourth gear is stored is adopted.

In such manner, the drive device 100 can acquire the current drive state of each of the actuators 40n by using the current detection resistor 81, the amplifier 82, the second comparator 83, and the monitor register 84. In the present embodiment, a monitor pattern can be used as the current drive state instead of the previous value of the control pattern. These components 81 to 84 can also be understood respectively as an acquisition device. However, the present disclosure may be not provided with the components 81 to 84. In particular, the monitor register 84 may be not provided.

The monitor register 84 has address bits respectively corresponding to the actuators 401 to 408. In the monitor register 84, a signal (i.e., a value) indicating the energization state of each of the actuators 401 to 408 is written in the relevant address bits. The signal indicating the energization state of the actuators 401 to 408 is an output of the relevant one of the second comparators 83.

In the monitor register 84, for example, 1 is written as a signal indicating energization and 0 is written as a signal indicating non-energization. Therefore, the monitor pattern can be represented by 0 and 1. In the present embodiment, an 8-bit control pattern is adopted as an example. Therefore, the monitor pattern has 8 bits, which is the same as the control pattern.

Note that a first bit 841 of the monitor register 84 corresponds to the first actuator 401. Similarly, each of a second bit 842 to an eighth bit 848 corresponds to each of the second actuator 402 to the eighth actuator 408.

The waveform analysis circuit 90 receives a rotation sensor signal which is an output of the rotation sensor 600. The waveform analysis circuit 90 determines a vehicle speed based on the rotation sensor signal, for example based on pulses per second. The waveform analysis circuit 90 determines, for example, whether the vehicle speed is high speed, low speed, or 0 (i.e., stop of the vehicle).

The waveform analysis circuit 90 determines that the speed is high when the rotation sensor signal reaches a predetermined threshold value. Further, the waveform analysis circuit 90 determines that the speed is low when the rotation sensor signal does not reach the predetermined threshold value and is not 0. Further, the waveform analysis circuit 90 determines that the vehicle is stopped when the rotation sensor signal is or indicates 0.

Therefore, the vehicle speed can be regarded as the current drive state of each of the actuators 40n. Therefore, the waveform analysis circuit 90 can also be understood as an acquisition device. However, the present disclosure does not have to include the waveform analysis circuit 90. Note that the rotation sensor 600 is a sensor that outputs an electric signal according to the drive state of the load.

Further, in the present embodiment, the rotation sensor 600 is adopted as an example of a sensor that outputs an electric signal according to the drive state of the load. However, the present disclosure is not limited to such example. Similar to the later embodiments, the present embodiment can adopt the following as a sensor that outputs an electric signal, such as a hydraulic sensor, an oil temperature sensor, a P-lock sensor, or the like. That is, the drive device 100 may be connected to the oil pressure sensor, the oil temperature sensor, or the P-lock sensor (parking lock sensor).

In such case, the drive device 100 may transmit the electric signal output from each sensor to the ECU 200 via the communication bus B1. As a result, the load drive system 1000 can suppress an increase in the number of signal lines.

Thus, the load drive system 1000 can be constructed/manufactured at low cost.

<Processing Operation>

The processing operation of the load drive system 1000 is described with reference to FIGS. 12 to 15.

First, the processing operation of the ECU 200 is described with reference to FIG. 12. The ECU 200 starts the processing operation shown in a flowchart of FIG. 12 at predetermined time intervals or when an event occurs.

In step S10, a load drive transition is determined. The CPU 2011 determines the load drive transition by (or as) determining the load drive signal instructed to the drive device 100. The CPU 2011 determines, for example, a load drive transition indicating that the automatic transmission is switched to the first gear.

In step S11, a drive prohibited state is put in force, i.e., is implemented, or the drive of the load is prohibited (a drive permission unit). The CPU 2011 puts the load in a drive prohibited state. Even if the CPU 2011 determines the load drive transition, it may be possible that the load is not normally drivable until "matching" is determined in step S14. Therefore, the CPU 2011 puts the load in the drive prohibited state until matching is determined in step S14. In other words, the CPU 2011 prohibits the drive of the load until it is determined that the load is not in a state of being abnormally driven. The drive prohibited state is a state in which the drive of the load by the drive device 100 is prohibited. In other words, transitioning to a new/update state is initially prohibited, until after matching successfully occurs in step S14, discussed in more detail below.

For example, the CPU 2011 releases the load drive prohibition by outputting a drive permission signal indicating permission of drive of the load to the drive device 100, that is, puts the load in a drive permission state. On the other hand, the CPU 2011 puts the load in a drive prohibited state by not outputting the drive permission signal to the drive device 100.

The CPU 2011 outputs a drive permission signal to the CAN controller 2 via the third signal line L3. Then, the CAN controller 2 outputs the update value of the control pattern to the SPI circuit 10 only when the drive permission signal is input. Therefore, the drive device 100 can drive the load only when the drive permission signal is input.

In step S12, a frame including a drive instruction message is transmitted (a transmitter). The CPU 2011 stores the drive instruction message corresponding to the load drive signal determined in step S11 in the message box for transmission of the CAN controller 2012. The CAN controller 2012 generates a frame including a drive instruction message, and transmits it to the communication bus B1 via the CAN transceiver 203. Here, a frame including a drive instruction message indicating a switching instruction to the first gear is transmitted to the drive device 100 via the communication bus B1. The CPU 2011 transmits a plurality of messages including the drive information indicating the drive state of the load to the drive device 100 via the communication bus B1.

In step S13, the load drive signal is acquired (an acquisition unit). The CPU 2011 acquires a load drive signal via the third signal line L3. That is, the CPU 2011 acquires the load drive signal from the drive device 100.

The CPU 2011 acquires the load drive signal in order to determine whether or not (i) the drive state instructed to the drive device 100 and (ii) the drive state that the drive device 100 is trying to execute match. Further, it can also be understood that the CPU 2011 acquires the load drive signal in order to determine whether or not the drive device 100 drives the load according to the instructed drive state (i.e., as instructed). Further, it can also be understood that the CPU 2011 acquires the load drive signal in order to determine whether or not the drive instruction message transmitted to the drive device 100 has been tampered.

In step S14, the drive instruction is compared. The CPU 2011 compares the drive instruction message transmitted in step S12 with the load drive signal received, i.e., acquired, in step S13. That is, it can also be understood that the CPU 2011 compares (i) the drive information transmitted by the ECU 200 via the communication bus B1 with (ii) the drive information transmitted from the drive device 100 via the third signal line L3 and acquired by the ECU 200. Further, it can also be understood that the ECU 200 compares (i) the drive state instructed by the drive device 100 with (ii) the drive state instructed to the drive device 100 from the ECU 200. For example, the CPU 2011 can convert the transmitted drive instruction message into a load drive signal, and can compare it with the received load drive signal, similar to the drive device 100.

As is described later in detail, when the drive device 100 receives the drive instruction message transmitted from the ECU 200, the drive device 100 converts the drive instruction message into a load drive signal. Then, the drive device 100 notifies the ECU 200 of the converted load drive signal. Therefore, the load drive signal received in step S13 matches the drive instruction message transmitted in step S12 if it has not been tampered.

Therefore, when the CPU 2011 determines that the drive instruction message transmitted in step S12 and the load drive signal received in step S13 match, the CPU 2011 proceeds to step S15. If the CPU 2011 determines unmatch, the CPU 2011 proceeds to step S17. If they match, it can be considered that the drive device 100 is not in a state of abnormally driving the load. On the other hand, if they do not match, it can be regarded as a state in which the drive device 100 abnormally drives the load.

The present disclosure is not limited to such configuration described above. The CPU 2011 may proceed to step S15 when the drive instruction message transmitted in step S12 and the load drive signal received in step S13 satisfy a predetermined correspondence relationship. In such, the CPU 2011 may proceed to step S17 if the predetermined correspondence relationship is not satisfied.

In step S15, the drive state is changed and the drive permission state is implemented, i.e., in force (a drive permission unit). If the CPU 2011 determines matching in step S14, the CPU 2011 outputs a drive permission signal to the drive device 100. As a result, the CPU 2011 puts the drive device 100 in the drive permission state. Note that the drive permission state is a state in which the drive device 100 is permitted to drive the load.

As described above, the load drive system 1000 is always, i.e., initially in other words, put in the drive prohibited state,
and is then put in the drive permission state only when it is determined in step S14 that they match. As a result, the load drive system 1000 can prevent the load from being driven by an erroneous/falsified instruction. Therefore, the load drive system 1000 can improve the reliability. However, the present disclosure may not include, i.e., may drop, steps S11, S15.

In step S16, it is determined that the operation is normal. The CPU 2011 determines that the drive device 100 operates the load normally. Further, it can also be understood that the CPU 2011 determines that the drive instruction message transmitted by the communication bus B1 has not been tampered. Further, it can also be understood that the CPU 2011 determines that the communication is normally performed on the communication bus B1.

In step S17, the number of (abnormal) state notifications is counted (an abnormality determination unit). The number of state notifications is the number of notifications of the load drive signal from the drive device 100. That is, the number of state notifications is the number of times the load drive signal is received in step S13. In addition, the number of state notifications can also be understood as the number of times of unmatch determination in S14. The CPU 2011 counts the number of state notifications each time it is determined in step S14 that there is an unmatch. The count number of state notifications is designated as N.

In step S18, it is determined whether or not N>5 (an abnormality determination unit). When the CPU 2011 determines that the count number N exceeds 5, the process proceeds to step S19, and when the CPU 2011 determines that the count number N does not exceed 5, the process returns to step S11. The threshold value '5' can also be understood as a predetermined number of times.

Note that the CPU 2011 clears the count number when, for example, matching is determined in step S14. That is, the CPU 2011 proceeds to step S19 when the count number N exceeds 5 without being determined as matching in step S14.

The CPU 2011 determines NO in step S18 and returns to step S11 to continue the drive prohibited state. Further, after step S11, the CPU 2011 again transmits a frame including the drive instruction message in step S12.

Note that 5 is adopted as an example of a predetermined number of times, which is a threshold value for the count number N. However, the present disclosure is not limited to such example. The predetermined number of times can be any number as long as it is a natural number of 1 or more. The smaller the predetermined number of times, the more quickly the communication abnormality can be determined. On the other hand, the larger the predetermined number of times, the more the erroneous determination of communication abnormality can be suppressed. Further, the present disclosure may not include, may drop, steps S17, S18.

In step S19, it is determined that the communication is abnormal (an abnormality determination unit). The CPU 2011 determines that the communication with the drive device 100 via the communication bus B1 is abnormal. That is, the CPU 2011 determines that the communication bus B1 has been attacked from the outside and cannot normally transmit the load drive signal to the drive device 100.

As described above, when the drive instruction message transmitted in step S12 and the load drive signal received in step S13 do not match, the CPU 2011 determines that the load drive signal received in step S13 is abnormal. Then, the CPU 2011 determines that the drive device 100 is in a state of abnormally driving the load because the load drive signal received in step S13 is abnormal. In step S20, an emergency interruption is performed (an abnormality handling unit).

When the CPU 2011 determines that the drive device 100 is in a state of abnormally driving the load, the CPU 2011 interrupts the load. The CPU 2011 outputs an emergency interruption instruction to the power supply circuit 70 via the first signal line L1. That is, the CPU 2011 outputs an emergency interruption instruction to the power supply circuit 70 without going through the CAN controller 2012 and the CAN transceiver 203. As a result, the CPU 2011 can suppress the drive control of each of the actuators 40n based on the load drive signal transmitted via the communication bus B1 in which the communication abnormality has occurred.

The CPU 2011 may output a transition instruction to a specific shift state via the first signal line L1. That is, the CPU 2011 can be adopted as long as it is configured to output an instruction to set the energization of the load into a predetermined abnormality handling state via the first signal line L1.

Next, the processing operation of the drive device 100 is described with reference to FIGS. 13 to 15. Upon receiving a frame, the drive device 100 starts the processing operation shown in a flowchart of FIG. 13.

In step S30, a frame received is stored in the reception message box (a receiver). The CAN controller 2 receives a frame via the communication bus B1.

Then, the CAN controller 2 stores, in the reception message box, data in the data field of the received frame. Here, a case where a frame including a drive signal message is received is adopted, i.e., explained/described. Further, it can also be understood that the received message includes the drive signal message. Note that the CAN controller 2 receives a plurality of messages.

In step S31, data is taken out. The CAN controller 2 takes out data from the reception message box.

In step S32, a drive instruction message is extracted. The CAN controller 2 extracts a drive instruction message from the data taken out in the above. In step S33, the drive instruction message is converted into a load drive signal. The CAN controller 2 converts the drive instruction message into a load drive signal. As a result, the drive instruction message is converted into, for example, 8-bit data (i.e., a control pattern). Therefore, the load drive signal is, i.e., made of as, data having a sufficiently smaller data amount (i.e., information amount) than the drive instruction message.

In step S34, the load drive signal is notified (a notifier). The CAN controller 2 notifies (i.e., transmits) the load drive signal converted in step S33 to the ECU 200 via the third signal line L3. That is, the CAN controller 2 notifies the converted load drive signal as the drive instruction message extracted in step S32.

Therefore, the CAN controller 2 can reduce the transmission information (i.e., information amount) as compared with the case where the drive instruction message which is the CAN message is transmitted to the ECU as it is. Therefore, the load drive system 1000 can be notified by using the third signal line L3, i.e., by using one signal line, and can have an inexpensive configuration. Further, the CAN controller 2 can transmit only the information required for determining whether or not the load is abnormally driven. Note that the ECU 200 acquires, as described above, the load drive signal output by the CAN controller 2 in step S13.

By the way, when the drive device 100 notifies, for example, an 8-bit load drive signal, it is conceivable to notify such a load drive signal using a plurality of signal lines. In such case, the load drive system 1000 needs to connect the drive device 100 and the ECU 200 with a plurality of signal lines. However, when the drive device 100 notifies the load drive signal, it may notify the signal as the duty of the pulse signal. Then, the ECU 200 determines the load drive signal based on the frequency and/or the duty.

In such case, the drive device 100 can notify the load drive signal by one signal line, i.e., via the third signal line L3. Therefore, in the load drive system 1000, it is not required to connect the drive device 100 and the ECU 200 with a plurality of signal lines in order to notify the load drive signal. Similar to the above, the load drive system 1000 can notify signal by a single signal line, i.e., via the third signal line L3, and can have an inexpensive configuration. Further, since the ECU 200 determines the load drive signal based on the frequency and/or the duty, it is not easily affected by noise. Further, since the ECU 200 is notified without using the communication bus B1, in step S14, comparison and determination is quickly performable without requiring data conversion time.

In the present embodiment, as shown in steps S33 and S34, an example of notifying the load drive signal obtained by converting the drive instruction message is adopted. However, the present disclosure is not limited to such example. In the present disclosure, the drive instruction message extracted in step S32 may be notified to the ECU 200 via the third signal line L3. In such manner, the load drive system 1000 can simplify the configuration of the drive device 100 because the drive device 100 does not perform conversion.

In step S35, a driver is driven as instructed. The drive device 100 drives (i.e., is "finally" permitted to drive) the load based on the data indicating the load drive signal included in the drive instruction message received in step S30 (from the ECU 200). That is, the drive device 100 drives the load according to the load drive signal converted in step S32. At such timing, the CAN controller 2 stores the converted load drive signal (i.e., a control pattern) in the control register 11. In the drive device 100, as described above, the drive IC 20 controls the drive of each of the actuators 40n according to the control pattern stored in the control register 11.

Note that, as described above, when the ECU 200 determines unmatch in step S14, the ECU 200 performs an emergency interruption of the load. However, the drive device 100 has a time allowance of about several hundred milliseconds or about 100 milliseconds between steps S34 and S35. Therefore, when the ECU 200 does not perform steps S17 and S18 or when an unmatch occurs four times or less, the drive device 100 can be prevented from driving the load with the load drive signal determined as unmatching. In such case, the ECU 200 does not have to proceed to step S19 and does not have to perform the process of setting the drive prohibited state. Further, when the drive device 100 notifies the ECU 200 of the load drive signal, the process shown in a flowchart of FIG. 14 may be started. Note that step S41 is the same as step S35.

In step S40, it is determined whether or not there is a permission instruction. The CAN controller 2 determines whether or not a drive permission signal is input via the third signal line L3. The drive permission signal is a signal output by the CPU 2011 in step S15.

When the drive permission signal is input, the CAN controller 2 determines that there is a permission instruction, and proceeds to step S41. If the drive permission signal is not input, the CAN controller 2 determines that there is no permission instruction, and proceeds to step S42.

In step S42, it is determined whether or not a predetermined time has elapsed. The CAN controller 2 determines whether or not a predetermined time has elapsed since the load drive signal was notified. In such case, when the CAN controller 2 notifies the load drive signal in step S34, measurement of the elapsed time starts at such timing by using a timer or the like. When the CAN controller 2 determines that the predetermined time has elapsed, the CAN controller 2 proceeds to step S43. If the CAN controller 2 does not determine that the predetermined time has elapsed, the CAN controller 2 proceeds, i.e., returns, to step S40.

The predetermined time is a predetermined amount/duration of time. For example, the predetermined time may be a duration of time required for notification of the load drive signal, time required for the comparison process in step S14, a total time required for the transmission of the drive permission signal, time including the total time and a margin, or and the like.

In step S43, the notification is performed. The CAN controller 2 notifies the ECU 200 that the drive permission signal is not input even though the load drive signal is notified.

Figure 12:
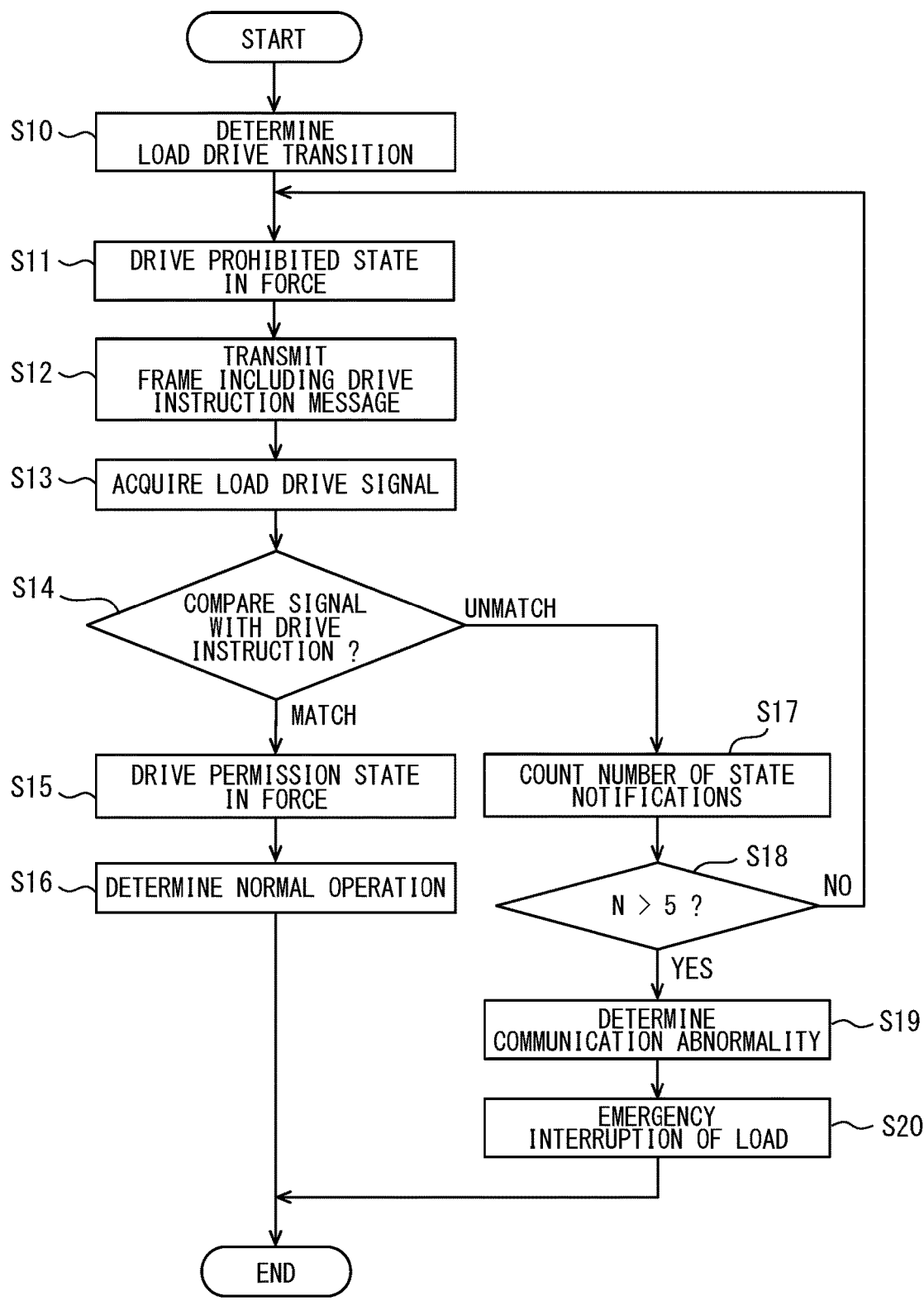
FIG. 12 is a flowchart showing the operation of an ECU in the first embodiment.
Figure 13:
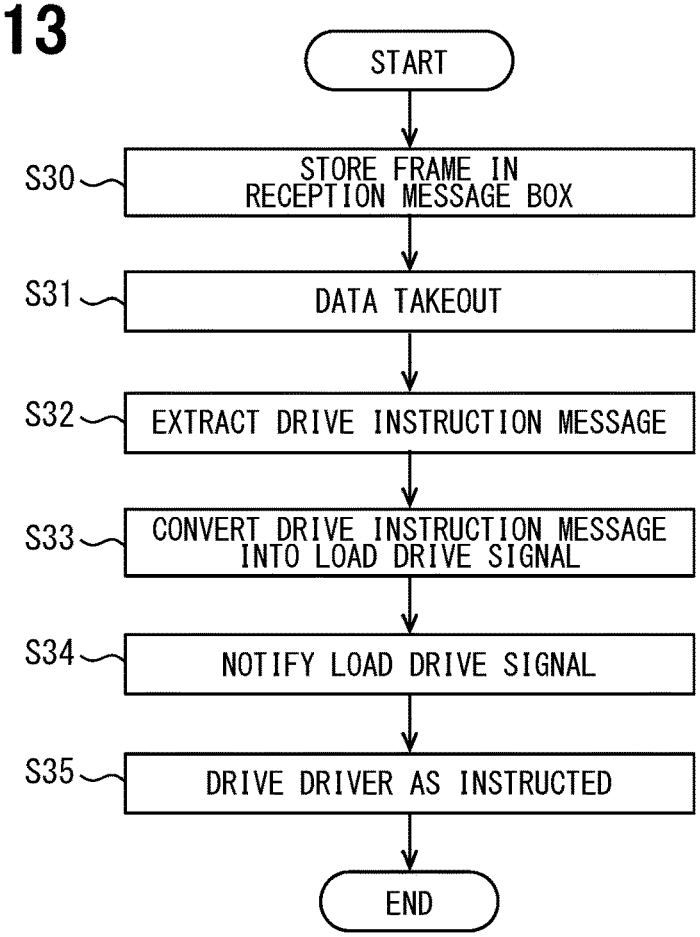
FIG. 13 is a flowchart showing the operation of the drive device at the time of receiving communication data in the first embodiment.
Figure 14:
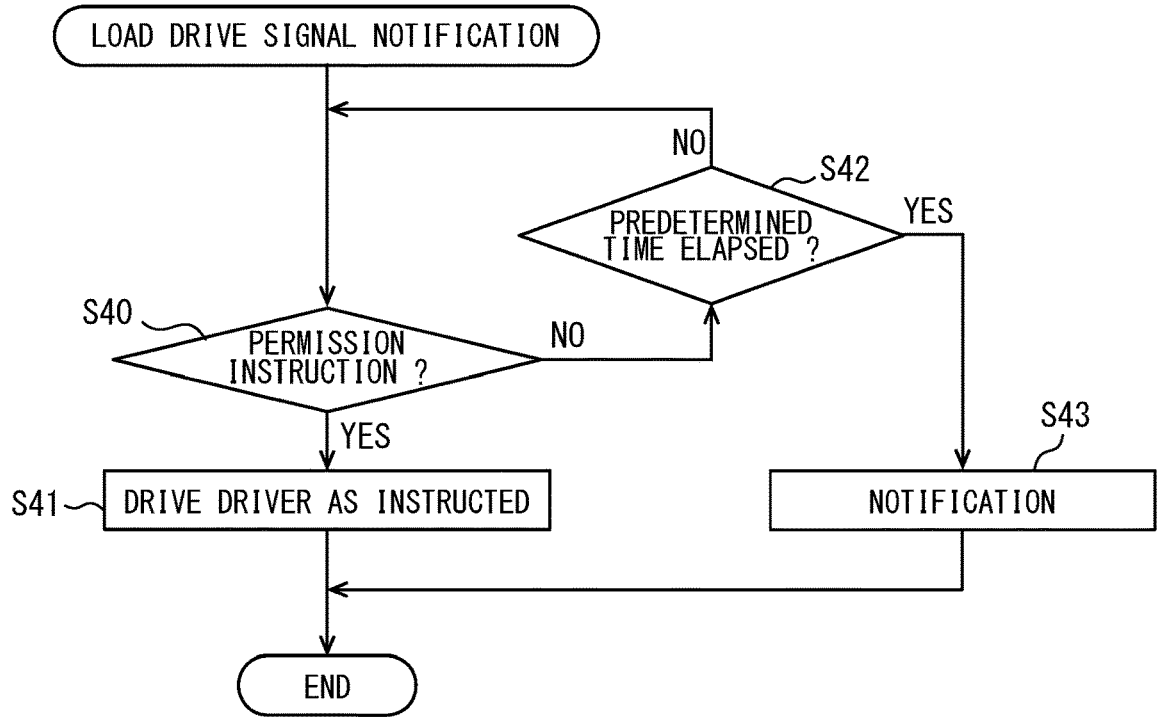
FIG. 14 is a flowchart showing the operation of the drive device at the time of notification of the load drive signal in the first embodiment.
Figure 15:
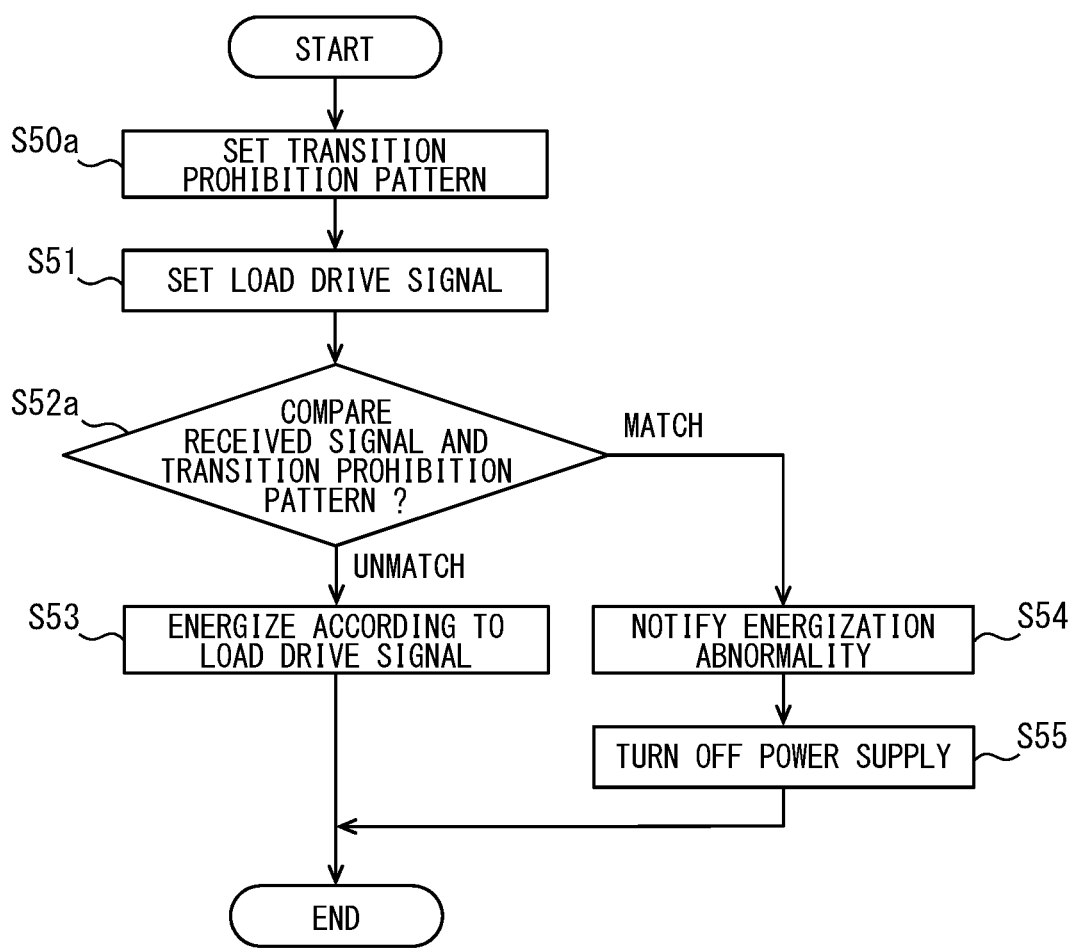
FIG. 15 is a flowchart showing the operation of the drive device in the first embodiment.

The processing operations shown in the flowcharts of FIGS. 12 to 14 can be applied to other embodiments. Further, when the drive device 100 receives the load drive signal, the drive device 100 may start the processing operation shown in a flowchart of FIG. 15. At such timing, it is assumed that the power supply circuit 70 outputs a signal indicating that the power supply switch 500 is turned ON. That is, an electric current is suppliable to each of the actuators 40n. In the present disclosure, it is not required to execute the processing operation shown in the flowchart of FIG. 15. In such case, the drive device 100 does not have to have a configuration related only to such processing operation.

In step S50a, a transition prohibition pattern is set. As described above, the second data loader 32, the third data loader 33, and the fourth data loader 34 select the transition prohibition pattern 52 corresponding to the previous value of the control pattern from the ROM 50, and set it in the fourth data register 64.

When a plurality of transition prohibition patterns 52 are stored in the ROM 50, the fourth data loader 34 writes the stored transition prohibition patterns 52 of the ROM 50 to the fourth data register 64 in order. Further, when the transition prohibition pattern 52 written in the fourth data register 64 is output to the first comparator 40, the fourth data loader 34 writes the next transition prohibition pattern 52 to the fourth data register 64.

In step S51, the load drive signal is set. As described above, the first data loader 31 loads the update value of the control pattern, which is the load drive signal, from the CAN controller 2. Then, the first data loader 31 sets the update value of the loaded control pattern in the first data register 61. When the control pattern is set in the first data register 61, the control pattern is output to the first comparator 40.

In step S52a, the received signal and the transition prohibition pattern are compared. The received signal is an update value of the control pattern. The first comparator 40 compares the update value of the control pattern set in the first data register 61 with the transition prohibition pattern 52 set in the fourth data register 64. When a plurality of transition prohibition patterns 52 are stored in the ROM 50, the first comparator 40 compares the update value of the control pattern with each transition prohibition pattern 52 in order. In such manner, the first comparator 40 compares the update value of the control pattern with each of the all transition prohibition patterns 52.

The first comparator 40 proceeds to step S53 when the update value of the control pattern and the all transition prohibition patterns 52 do not match. In such case, the update value of the control pattern can be regarded as normal.

On the other hand, when the update value of the control pattern and the transition prohibition pattern 52 match, the first comparator 40 proceeds to step S54. That is, even when only one of the transition prohibition patterns 52 matches the update value of the control pattern, the first comparator 40 proceeds to step S54. In such case, the update value of the control pattern can be regarded as abnormal.

In the present embodiment, 11100100 is adopted as the update value of the control pattern. Further, in the present embodiment, three patterns shown in FIG. 8 and the like are adopted as the transition prohibition pattern 52. Therefore, the update value of the control pattern ('11100100') matches the third transition prohibition pattern 52. Therefore, the first comparator 40 determines matching, i.e., determines that the update value of the control pattern and the transition prohibition pattern 52 match.

In step S53, energization is performed according to the load drive signal. The first comparator 40 outputs a normal signal indicating that the update value of the control pattern is normal. When a normal signal is input, the drive IC 20 energizes the actuator 40n according to the load drive signal written in the control register 11. That is, the CAN controller 2 stores the update value of the control pattern in the control register 11. Then, the drive IC 20 selectively turns the drive switches 301 to 308 ON and OFF according to the update value of the control pattern stored in the control register 11. In such manner, the drive IC 20 selectively supplies the electric current to the actuators 40n. In such manner, step S53 performs a similar process to step S35.

In step S54, an abnormality is notified. The first comparator 40 outputs, to the ECU 200, an abnormal signal indicating that the update value of the control pattern is abnormal. In such manner, the first comparator 40 notifies the ECU 200 of the abnormality. In such manner, the drive device 100 can quickly notify the ECU 200 of the abnormality by using the first comparator 40, and without using the microcontroller, i.e., without performing arithmetic operation or calculation. That is, it can also be understood that the drive device 100 can notify the ECU 200 of the abnormality earlier by using the first comparator 40 than in a configuration using the microcontroller for performing the arithmetic operation/calculation.

In step S55, the power supply is turned OFF. The first comparator 40 outputs an abnormal signal indicating that the update value of the control pattern is abnormal to the power supply circuit 70. It can also be understood that the first comparator 40 outputs the abnormal signal to the power supply circuit 70 to turn OFF, i.e., interrupt, the power supply to the actuators 40n. When the abnormal signal is input, the power supply circuit 70 turns OFF the power supply switch 500 to interrupt the supply of electric current to each of the actuators 40n. In such manner, the drive device 100 can prevent the actuator 40n from being driven by an abnormal control pattern. In such manner, step S55 performs a similar process to step S20.

It should be noted that the present disclosure may be configured to perform at least one of step S54 and step S55.

Further, the first comparator 40 may output the abnormal signal to the drive IC 20 without outputting it to the power supply circuit 70. In such case, the drive IC 20 selectively turns the drive switches 301 to 308 ON and OFF according to the previous value of the control pattern. In such manner, the drive IC 20 selectively supplies the electric current to the (relevant) actuators 40n.

<Effects>

As described above, the load drive system 1000 includes the drive device 100 that receives the drive instruction message transmitted from the ECU 200 and drives the load based on the load drive signal included in the received drive instruction message. Then, the drive device 100 extracts the received message or load drive signal, and notifies the ECU 200 of the extracted load drive signal via the third signal line L3 different from the communication bus B1. Therefore, the ECU 200 can confirm the certainty of the instruction to the drive device 100. Further, since the load drive system 1000 notifies the ECU 200 via the third signal line L3 different from the communication bus B1, even if the communication bus B1 is under a cyberattack, the load drive signal is appropriately notified to the ECU 200. Further, since the load drive system 1000 can confirm the certainty of the instruction from the ECU 200 to the drive device 100, it is not required to perform encryption or the like. Therefore, the load drive system 1000 can suppress an increase in the processing load of the ECU 200 and the drive device 100.

Further, the ECU 200 can determine that the drive device 100 is in a state of abnormally driving the load by the load drive signal acquired from the drive device 100. When the drive device 100 notifies the load drive signal before the drive device 100 actually drives the load, the ECU 200 can determine in advance an abnormal drive of the load by the drive device 100.

Further, the load drive system 1000 can prevent the load from being driven based on an erroneous/falsified load drive signal without using encryption processing or the like. The erroneous load drive signal can also be understood as an unintended load drive signal. When the load is driven based on an erroneous load drive signal, the load is in a drive state different from an indicated drive state.

Further, the drive device 100 stores the transition prohibition pattern 52. Then, the drive device 100 can determine whether or not a situation is an abnormality in which the update value of the control pattern transitions to the prohibited transition pattern, by comparing the update value of the control pattern with the transition prohibition pattern 52.

More specifically, the drive device 100 can determine whether or not the update value of the control pattern received by the CAN controller 2, not the current value of the control pattern stored in the control register 11, is abnormal. Therefore, the drive device 100 can determine whether or not the load drive signal included in the frame transmitted via the communication bus B1 has been tampered by spoofing or the like. Therefore, the drive device 100 can perform/implement countermeasures against falsification/tampering of the update value of the control pattern without performing complicated processing such as communication authentication and encryption by the microcontroller.

Further, the drive device 100 can determine whether or not the received update value of the control pattern is abnormal before controlling the drive of each of the actuators 40n. That is, the drive device 100 can suppress driving each of the actuators 40n with an abnormal control pattern.

Further, as a countermeasure against falsification/tampering, as described above, authentication or encryption of communication by a microcontroller can be considered. However, countermeasures by authentication and encryption are required to always correspond to/catch up with the latest technology. Therefore, in such method, it is required to update the program of the microcontroller or the like, which leads to an increase in cost.

Furthermore, as a countermeasure against falsification/tampering, monitoring of communication by a microcontroller can be considered. However, in order to monitor communication, the communication amount increases due to the encryption of messages/communication, thereby lowering the communication speed. Therefore, such method adds a cost of implementing higher communication speed.

Thus, the above-mentioned additional cost can be suppressed.

As the determination pattern, a transition permission pattern indicating a drive state in which a drive transition from a drive state indicated by the previous value of the control pattern is permitted can also be adopted. However, the drive device 100 stores the transition prohibition pattern 52 in the ROM 50 as a determination pattern. The transition prohibition pattern 52 has a smaller number of patterns than the transition permission pattern. Therefore, the drive device 100 can reduce the capacity (e.g., memory area) occupied by the determination pattern in the ROM 50.

Unlike the ECU 200, the drive device 100 does not include a microcontroller. Therefore, the drive device 100 can be made smaller than the configuration including a microcontroller. In addition, the drive device 100 can reduce power consumption and heat generation as compared with a configuration including a microcontroller. In such manner, the drive device 100 can have less restrictions on the physique and mountability related to heat generation than the configuration including a microcontroller. That is, the drive device 100 can have a higher degree of freedom in mounting on a vehicle, e.g., in an engine room or the like, than a configuration including a microcontroller. Further, the drive device 100 can have less-complicated/costly countermeasures regarding the functional safety and the security as compared with the configuration including a microcontroller.

The load drive system 1000 includes the drive device 100. Therefore, the load drive system 1000 can perform/implement countermeasures against falsification/tampering of the update value of the control pattern in the drive device 100 without performing complicated processing such as communication authentication and encryption by the microcontroller. The load drive system 1000 can suppress an increase in cost as compared with a configuration using a drive device equipped with a microcontroller, and can prevent a transition to a prohibited transition pattern due to tampering at low cost. The load drive system 1000 can reduce the capacity occupied by the determination pattern in the ROM 50. Further, the load drive system 1000 can have less-complicated/costly countermeasures regarding the functional safety and the security as compared with the configuration including a microcontroller.

Figures 16, 17:
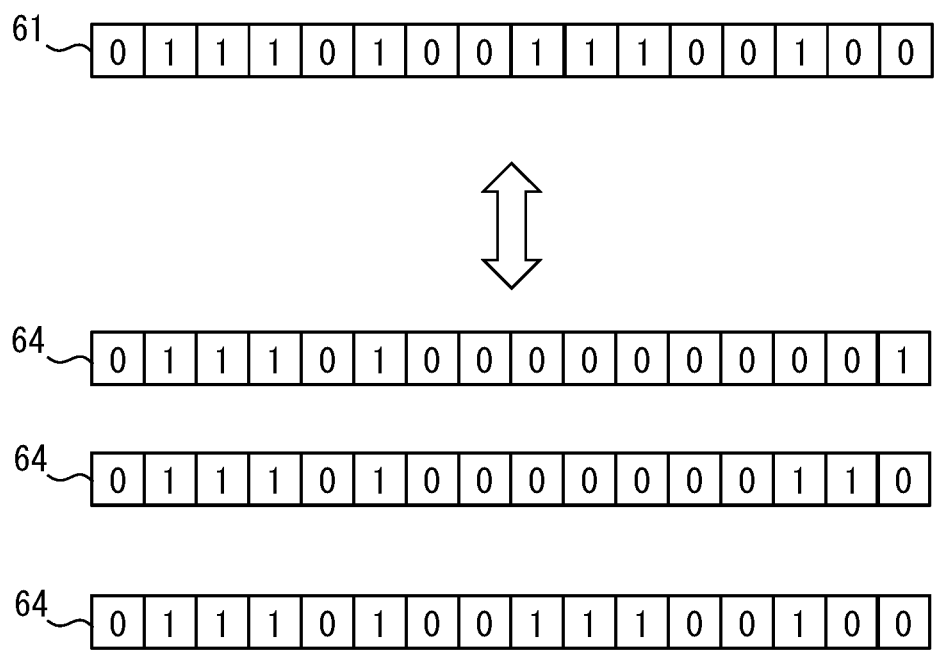
FIG. 16 is a schematic diagram showing a transition prohibition pattern in the first modification.
FIG. 17 is a schematic diagram showing a transition prohibition pattern in a second modification.

First Modification of First Embodiment, FIG. 16

Note that (a) the transition prohibition pattern 52 and (b) the comparison target of the transition prohibition pattern 52 are not limited to the above. For example, as shown in a first modification shown in FIG. 16, as the comparison target of the transition prohibition pattern 52, a transition pattern in which the previous value and the update value of the control pattern are arranged (side by side) can be adopted. In such case, as the transition prohibition pattern 52, an arrangement is adoptable in which (i) the previous value of the control pattern and (ii) the energization pattern indicating a prohibited drive state to which a drive transition from the drive state indicated by the previous value is prohibited are arranged side by side. The first comparator 40 compares the transition pattern with the transition prohibition pattern 52.

In an example of FIG. 16, as one representative example, a transition pattern in which a control pattern indicating the fourth gear as the previous value of the control pattern and a control pattern indicating the first gear as the update value of the control pattern are arranged side by side is shown. In such case, the transition prohibition pattern 52 is adopted as three arrangements: as (a) an arrangement of a control pattern indicating the fourth gear and a control pattern indicating the P range, (b) an arrangement of a control pattern indicating the fourth gear and a control pattern indicating the R range, and (c) an arrangement of a control pattern indicating the fourth gear and a control pattern indicating the first gear (which are respectively, a 16-bit arrangement side by side.

Second Modification of First Embodiment, FIG. 17

Further, the transition prohibition pattern 52 and the comparison target of the transition prohibition pattern 52 can be adopted even if they are converted into identifiers. For example, as shown in a second modification shown in FIG. 17, the control pattern (the update value, the previous value) and the transition prohibition pattern 52 are converted into a 4-bit identifier. The first comparator 40 compares (i) an identifier in which the update value of the control pattern is converted with (ii) an identifier in which the transition prohibition pattern 52 is converted.

It should be noted that the first modification and the second modification can be combined and carried out. In such case, the transition pattern is an arrangement of (i) an identifier obtained by converting the previous value of the control pattern and (ii) an identifier converted by the update value of the control pattern. Similarly, the transition prohibition pattern 52 may also be an arrangement of (i) an identifier in which the previous value of the control pattern is converted and (ii) an identifier in which an energization pattern indicating a drive state to which a drive transition from a drive state indicated by the previous value is prohibited is converted.

One of the preferred embodiments of the present disclosure has been described above. However, the present disclosure is not limited to the above embodiment, and various modifications are possible without departing from the spirit and scope of the present disclosure. Hereinafter, the second to tenth embodiments are described as other embodiments of the present disclosure. The above-described embodiment and the second to tenth embodiments can be carried out individually, or can also be carried out in combination as appropriate. The present disclosure can be carried out as various combinations without being limited to the combination(s) illustrated in the embodiments.

Figure 18:
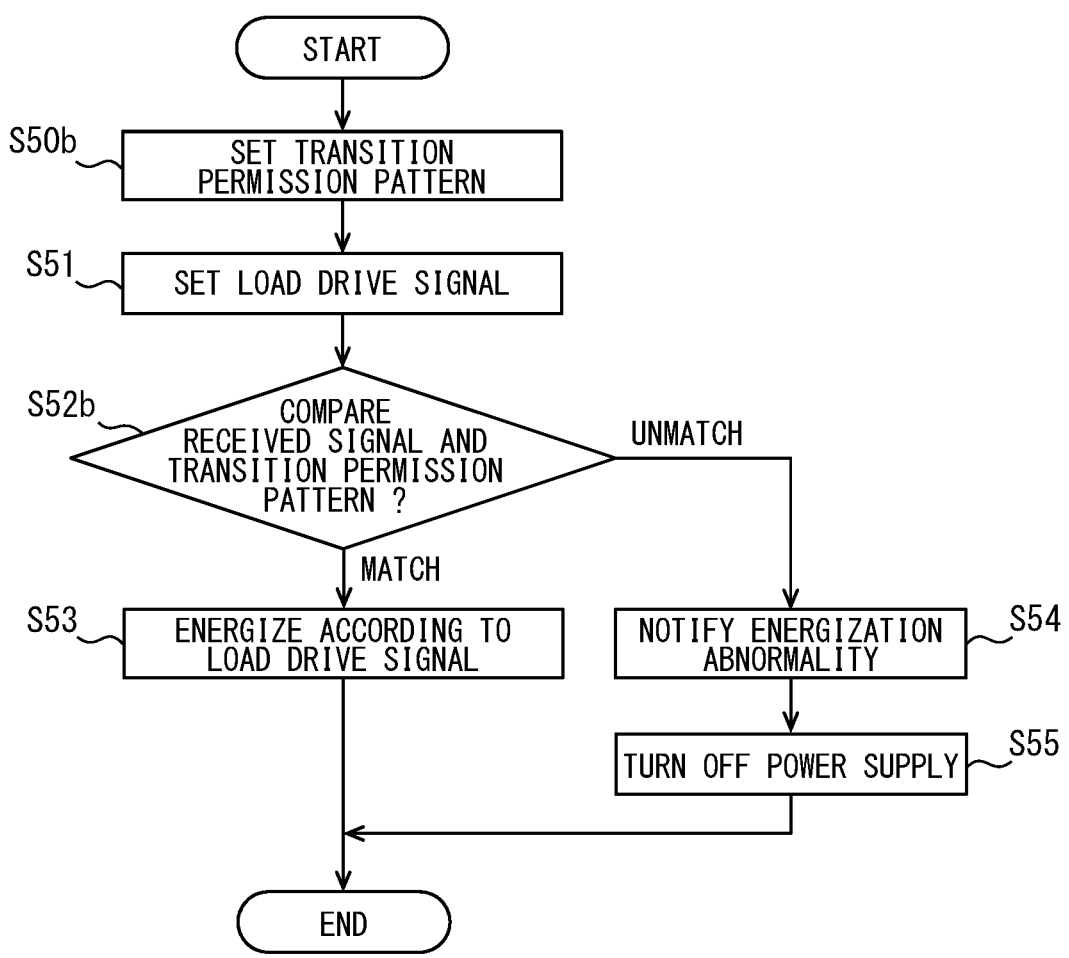
FIG. 18 is a flowchart showing the operation of the drive device in the second embodiment.

Second Embodiment, FIG. 18

The drive device 100 and the load drive system 1000 of the second embodiment are described with reference to FIG. 18. In the present embodiment, mainly, a part different from the previously described embodiment is described. Similar parts to the preceding embodiment described above can appropriately be adopted. Such scheme in description is the same in each of the following embodiments.

The drive device 100 and the load drive system 1000 of the present embodiment have the same configuration as that of the first embodiment. Therefore, in the present embodiment, the same reference numerals are used for the same component or the same configuration as those in the first embodiment. The present embodiment is different from the first embodiment in that a transition permission pattern is used instead of the transition prohibition pattern 52.

The ROM 50 stores the energization pattern 51 and a transition permission pattern. It can also be understood that the ROM 50 has an energization pattern memory in which the energization pattern 51 is stored and a transition permission pattern memory in which the transition permission pattern is stored. The ROM 50 can also be understood as a determination pattern storage unit.

The transition permission pattern is an energization pattern indicating a drive state for each of the actuators 40*n*. The transition permission pattern is a value that correlates with the drive transition from the current drive state. The transition permission pattern is a determination value for determining whether or not the update value of the control pattern is abnormal. The ROM 50 stores the control pattern and the transition permission pattern in association with each other.

The transition permission pattern indicates a drive state in which a drive transition from the drive state indicated by the previous value of the control pattern is permitted. It can also be understood that the transition permission pattern indicates a permission of the drive transition from the current drive state. The transition permission pattern can also be understood as an energization pattern indicating a drive transition that is an operation permitted as an automatic transmission. The transition permission pattern can also be understood as a transition determination value and a permission determination value.

Upon receiving a load drive signal, the drive device 100 starts an operation shown in a flowchart of FIG. 18. In FIG. 18, the same step number is assigned to the same process as in FIG. 15.

In step S50*b*, a transition permission pattern is set. The sequence circuit 30 sets the transition permission pattern in the fourth data register 64 in the same manner as setting the transition prohibition pattern 52. That is, the sequence circuit 30 selects a transition permission pattern corresponding to the previous value of the control pattern from the ROM 50, and sets the selected transition permission pattern in the fourth data register 64.

Step S52*b* compares the received signal with the transition permission pattern. The received signal can also be understood as an update value of the control pattern. The first comparator 40 compares the update value of the control pattern set in the first data register 61 with the transition permission pattern set in the fourth data register 64 (i.e., a determination unit).

The first comparator 40 proceeds to step S53 when the update value of the control pattern and at least one transition permission pattern match. In such case, the update value of the control pattern can be regarded as normal. As described above, the first comparator 40 determines that the predetermined correspondence relationship is not satisfied when the update value of the control pattern and at least one transition permission pattern match.

On the other hand, when the update value of the control pattern and the all transition permission patterns do not match, the first comparator 40 proceeds to step S54. In such case, the update value of the control pattern can be regarded as abnormal. In such manner, the first comparator 40 determines that a predetermined correspondence relationship is satisfied when the update value of the control pattern and the all transition permission patterns do not match. Further, when the transition permission pattern and the update value of the control pattern do not match, it can also be understood that the update value of the control pattern is not included in the transition permission pattern.

The drive device 100 of the second embodiment can exert the same effects as the drive device 100 of the first embodiment. The load drive system 1000 of the second embodiment can exert the same effects as the load drive system 1000 of the first embodiment.

Figure 19:
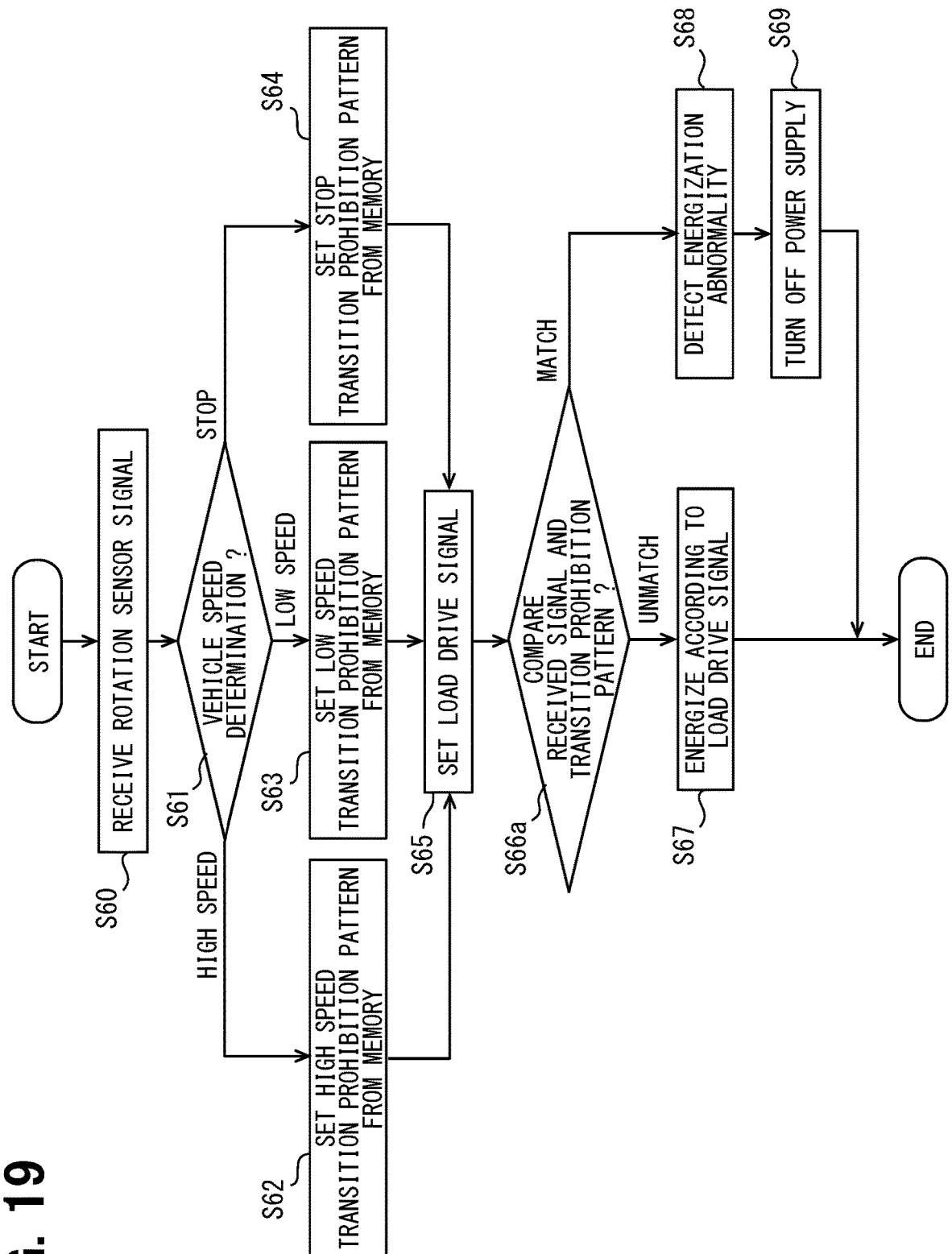
FIG. 19 is a flowchart showing the operation of the drive device in a third embodiment.

Third Embodiment, FIG. 19

The drive device 100 and the load drive system 1000 of the third embodiment are described with reference to FIG. 19. For example, the drive device 100 and the load drive system 1000 of the present embodiment have the same configuration as that of the first embodiment. Therefore, in the present embodiment, the same reference numerals are used for the same component or the same configuration as those in the first embodiment.

The present embodiment is different from the first embodiment in that the vehicle speed determined by the waveform analysis circuit 90 is used as the current drive state instead of using the previous value of the control pattern. Therefore, the drive device 100 of the present embodiment needs to include the waveform analysis circuit 90.

The transition prohibition pattern 52 is stored in association with the vehicle speed determined by the waveform analysis circuit 90 which is the current drive state. The transition prohibition pattern 52 is stored in association with a signal indicating each of vehicle speeds indicated by, for example, 0 and 1. For example, the transition prohibition pattern 52 associated with a high speed adopts an energization pattern indicating the first gear, the P range, and the R range. The transition prohibition pattern 52 associated with a low speed adopts an energization pattern indicating the P range and the R range. The transition prohibition pattern 52 associated with a stop of the vehicle adopts an energization pattern indicating the third gear and the fourth gear. The transition prohibition pattern 52 can also be understood as a transition determination value or a prohibition determination value.

Upon receiving a load drive signal, the drive device 100 starts an operation shown in a flowchart of FIG. 19. Step S65 is the same as step S51. Step S66a is the same as step S52a. Steps S67 to S69 are the same as/similar to steps S53 to S55.

In step S60, the rotation sensor signal is received. The waveform analysis circuit 90 receives the rotation sensor signal from the rotation sensor 600.

In step S61, a vehicle speed is determined. The waveform analysis circuit 90 determines the vehicle speed from a received rotation sensor signal. The waveform analysis circuit 90 proceeds to step S62 when the vehicle speed is determined as high speed, proceeds to step S63 when the vehicle speed is determined as low speed, and proceeds to step S64 when the vehicle speed is determined as 0 (zero: stop of the vehicle).

In step S62, a high speed transition prohibition pattern is set from the memory. The sequence circuit 30 sets the transition prohibition pattern 52 associated with high speed from the ROM 50 in the fourth data register 64.

In step S63, a low speed transition prohibition pattern is set from the memory. The sequence circuit 30 sets the transition prohibition pattern 52 associated with the low speed from the ROM 50 in the fourth data register 64.

In step S64, a stop transition prohibition pattern for stopping vehicle is set from the memory. The sequence circuit 30 sets the transition prohibition pattern 52 associated with the stop (e.g., parking) of the vehicle from the ROM 50 in the fourth data register 64.

In such manner, the sequence circuit 30 acquires the transition prohibition pattern 52 associated with the vehicle speed acquired by the waveform analysis circuit 90 from the ROM 50. Note that the memory in steps S62 to S64 can also be understood as the transition prohibition pattern memory in the ROM 50.

The drive device 100 of the third embodiment can exert the same effects as the drive device 100 of the first embodiment. Further, the load drive system 1000 of the third embodiment can exert the same effects as the load drive system 1000 of the first embodiment.

Figure 20:
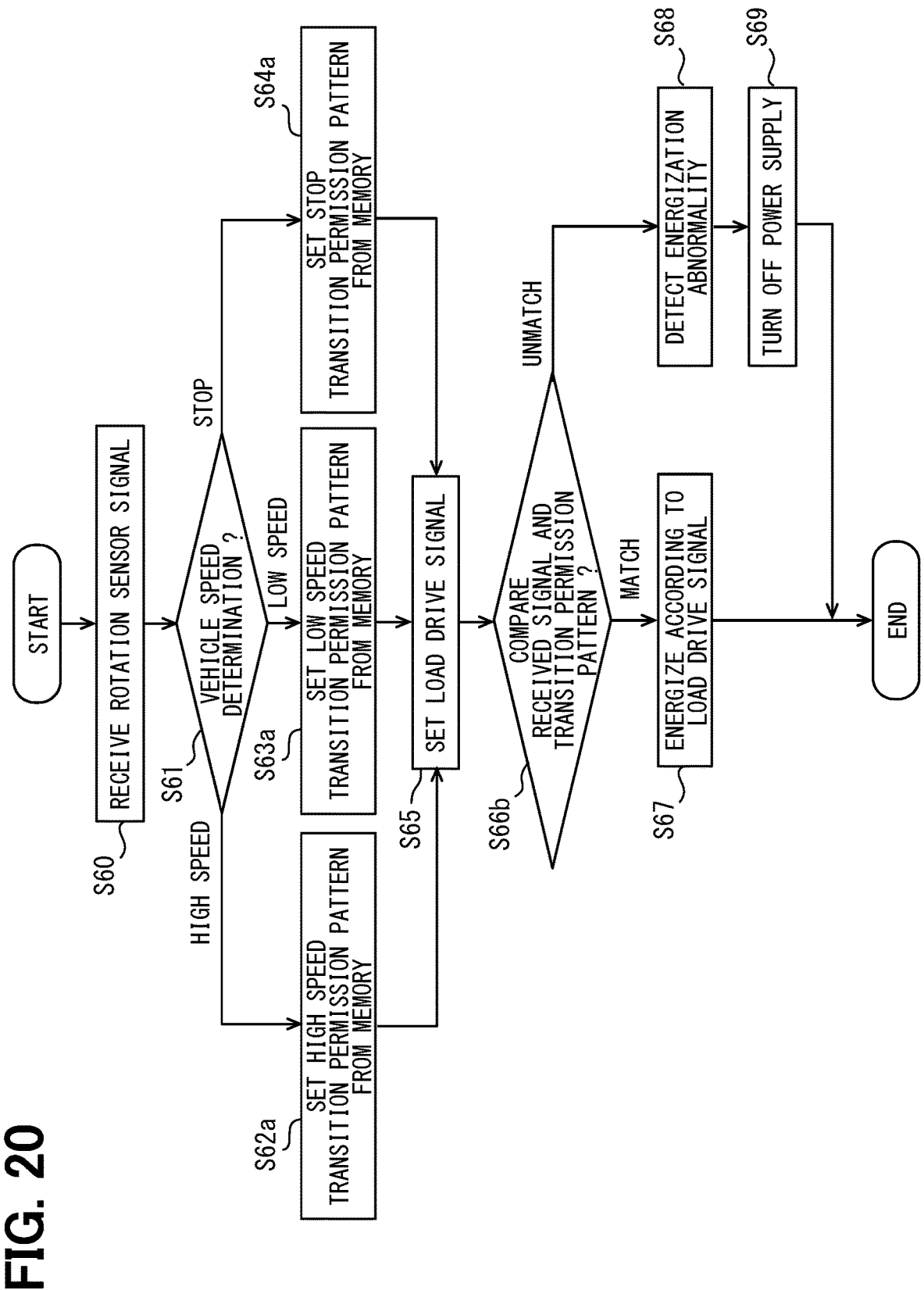
FIG. 20 is a flowchart showing the operation of the drive device in a fourth embodiment.

Fourth Embodiment, FIG. 20

The drive device 100 and the load drive system 1000 of the fourth embodiment are described with reference to FIG. 20. For example, the drive device 100 and the load drive system 1000 of the present embodiment have the same configuration as that of the first embodiment. Therefore, in the present embodiment, the same reference numerals are used for the same component or the same configuration as those in the first embodiment. Similar to the third embodiment, the present embodiment uses the vehicle speed determined by the waveform analysis circuit 90 as the current drive state. Therefore, the drive device 100 of the present embodiment needs to include the waveform analysis circuit 90. Further, in the present embodiment, as in the second embodiment, the transition permission pattern is used as the transition determination value.

The transition permission pattern is stored in association with the vehicle speed determined by the waveform analysis circuit 90 in the current drive state. The transition permission pattern is stored in association with a signal indicating each of the vehicle speeds represented by, for example, 0 and 1. As the transition permission pattern associated with the high speed, an energization pattern indicating the second gear, the third gear, and the fourth gear is adopted. As the transition permission pattern associated with the low speed, an energization pattern indicating the first gear, the second gear, and the third gear is adopted. As the transition permission pattern associated with the stop of the vehicle, an energization pattern indicating the first gear, the second gear, the P range, and the R range is adopted. The transition permission pattern can also be understood as a transition determination value and a permission determination value.

Upon receiving the load drive signal, the drive device 100 starts the operation shown in a flowchart of FIG. 20. In FIG. 20, the same step number is assigned to the same process as in FIG. 19. Not that Step S66b is the same as step S52b.

In step S62a, a high speed transition permission pattern is set from the memory. The sequence circuit 30 sets the transition permission pattern associated with high speed from the ROM 50 in the fourth data register 64.

In step S63a, a low speed transition permission pattern is set from the memory. The sequence circuit 30 sets the transition permission pattern associated with the low speed from the ROM 50 in the fourth data register 64.

In step S64a, a stop transition permission pattern when the vehicle is stopped is set from the memory. The sequence circuit 30 sets the transition permission pattern associated with the stop of the vehicle from the ROM 50 in the fourth data register 64.

In such manner, the sequence circuit 30 acquires the transition permission pattern associated with the vehicle speed acquired by the waveform analysis circuit 90 from the ROM 50. Note that the memory in steps S62*a* to S64*a* can also be understood as the transition permission pattern memory in the ROM 50.

The drive device 100 of the fourth embodiment can exert the same effect as the drive device 100 of the first, second, and third embodiments. Further, the load drive system 1000 of the fourth embodiment can exert the same effects as the load drive system 1000 of the first, second, and third embodiments.

Figure 21:
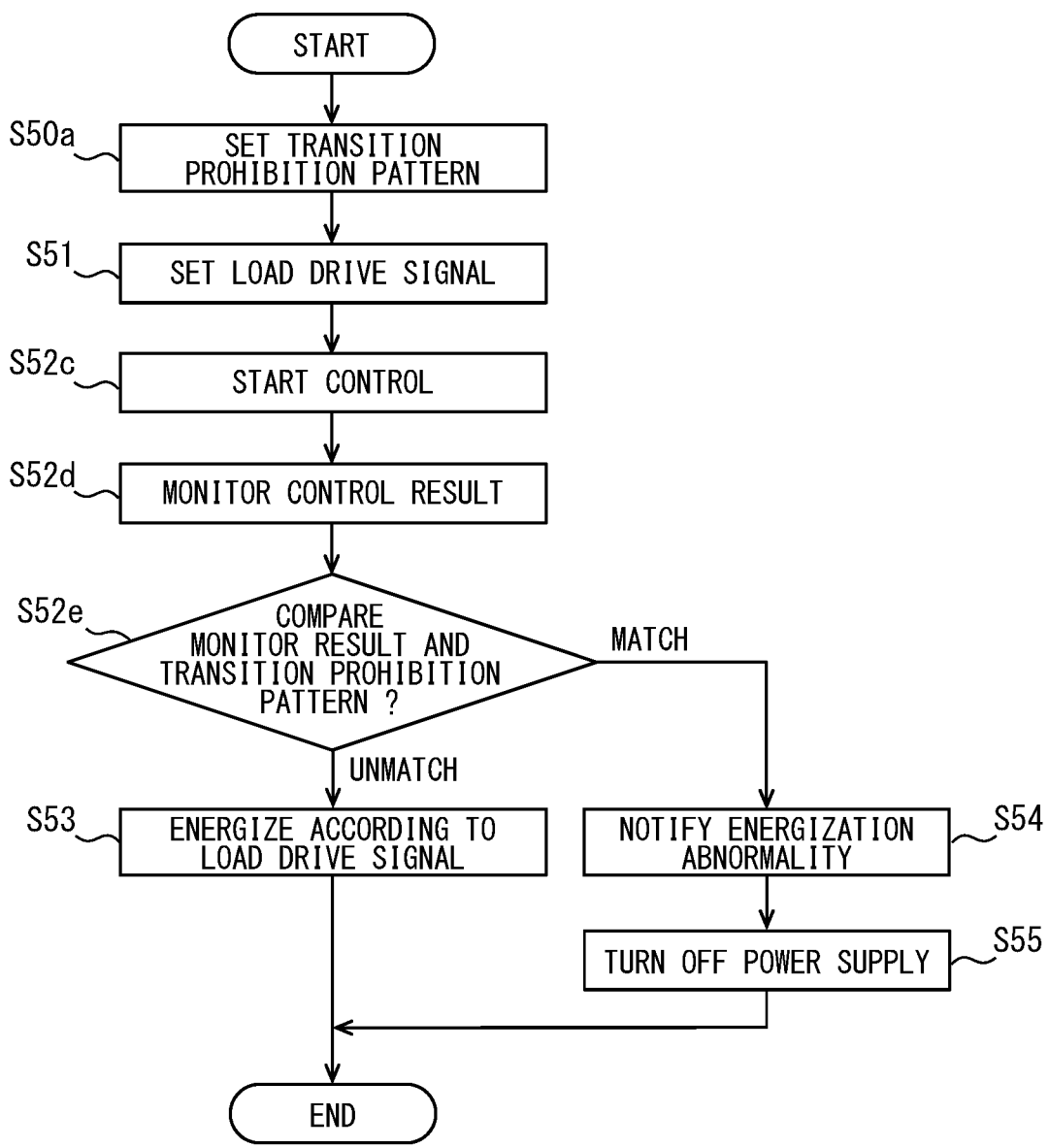
FIG. 21 is a flowchart showing the operation of the drive device in a fifth embodiment.

Fifth Embodiment, FIG. 21

The drive device 100 and the load drive system 1000 of the fifth embodiment are described with reference to FIG. 21. For example, the drive device 100 and the load drive system 1000 of the present embodiment have the same configuration as that of the first embodiment. Therefore, in the present embodiment, the same reference numerals are used for the same component or the same configuration as those in the first embodiment. The present embodiment is different from the first embodiment in that the monitor pattern stored in the monitor register 84 is used as the correlated drive state instead of using the update value of the control pattern. Therefore, the drive device 100 of the present embodiment needs to include the current detection resistor 81, the amplifier 82, the second comparator 83, and the monitor register 84. Note that the transition prohibition pattern 52 of the present embodiment is the same as that of the first embodiment.

Upon receiving a load drive signal, the drive device 100 starts an operation shown in a flowchart of FIG. 21. In FIG. 21, the same step number is assigned to the same process as in FIG. 15.

In step S52*c*, control is started. The CAN controller 2 stores the update value of the control pattern in the control register 11. Then, the drive IC 20 selectively turns the drive switches 301 to 308 ON and OFF according to the update value of the control pattern stored in the control register 11. In such manner, the drive IC 20 selectively supplies the electric current to the actuators 40*n*. The drive IC 20 can be regarded as performing control in order to acquire the monitor pattern.

In step S52*d*, a control result is monitored. The drive device 100 stores the monitor pattern in the monitor register 84 by operating the current detection resistor 81, the amplifier 82, and the second comparator 83 as described above.

In step S52*e*, the monitor result and the transition prohibition pattern are compared. The monitor result can also be understood as a monitor pattern. The first comparator 40 compares the monitor pattern set in the first data register 61 with the transition prohibition pattern 52 set in the fourth data register 64. When a plurality of transition prohibition patterns 52 are stored in the ROM 50, comparison is performed in the same manner as in the above embodiment.

The first comparator 40 proceeds to step S53 when the monitor pattern and all of the transition prohibition patterns 52 do not match. In such case, the monitor pattern can be considered as normal. Further, when the monitor pattern is normal, it can be considered that the update value of the control pattern is normal.

On the other hand, when the monitor pattern and the transition prohibition pattern 52 match, the first comparator 40 proceeds to step S54. That is, when any one of the transition prohibition patterns 52 matches the monitor pattern, the first comparator 40 proceeds to step S54. In such case, the monitor pattern can be regarded as abnormal. As described above, when any one of the transition prohibition patterns 52 matches the monitor pattern, the first comparator 40 determines that the predetermined correspondence relationship is satisfied. Further, since the monitor pattern is abnormal, it can be considered that the update value of the control pattern is abnormal.

The drive device 100 of the fifth embodiment can exert the same effects as the drive device 100 of the first embodiment. Further, the load drive system 1000 of the fifth embodiment can exert the same effects as the load drive system 1000 of the first embodiment. Further, for example, even when the automatic transmission is actually instructed to shift from the fourth gear to the P range, the automatic transmission does not immediately shift (i.e., load drive transition is not immediately realized as gear shift) to the P range due to the response of the hydraulic control or the like. Therefore, the drive device 100 can use the monitor pattern instead of the update value of the control pattern.

Figure 22:
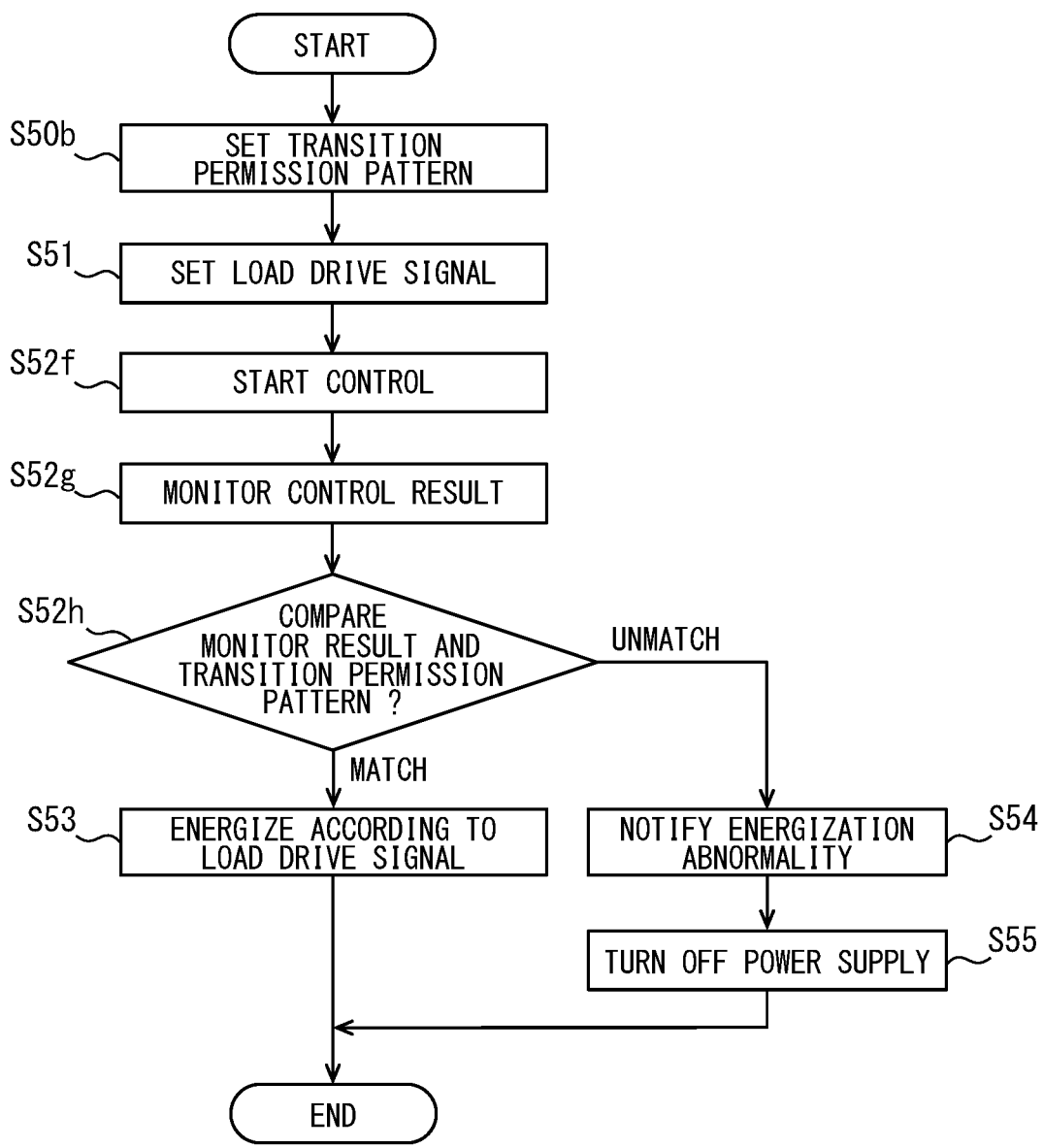
FIG. 22 is a flowchart showing the operation of the drive device in a sixth embodiment.

Sixth Embodiment, FIG. 22

The drive device 100 and the load drive system 1000 of the sixth embodiment are described with reference to FIG. 22. For example, the drive device 100 and the load drive system 1000 of the present embodiment have the same configuration as that of the first embodiment. Therefore, in the present embodiment, the same reference numerals are used for the same component or the same configuration as those in the first embodiment. In the present embodiment, as in the fifth embodiment, the monitor pattern stored in the monitor register 84 is used as the correlated drive state instead of the update value of the control pattern. Further, in the present embodiment, as in the second embodiment, the transition permission pattern is used as the transition determination value.

Upon receiving a load drive signal, the drive device 100 starts an operation shown in a flowchart of FIG. 22. In FIG. 22, the same step numbers are assigned to the same processes as those in FIGS. 15 and 18. Further, steps S52*f* and S52*g* are the same as steps S52*c* and S52*d*.

In step S52*h*, the monitor result and the transition permission pattern are compared. The monitor result can also be understood as a monitor pattern. The first comparator 40 compares the monitor pattern set in the first data register 61 with the transition permission pattern set in the fourth data register 64. When a plurality of transition permission patterns are stored in the ROM 50, comparison is performed in the same manner as in the above embodiment.

The first comparator 40 proceeds to step S53 when the monitor pattern and at least one transition permission pattern match. In such case, the monitor pattern can be considered as normal. As described above, the first comparator 40 determines that the predetermined correspondence relationship is not satisfied when the monitor pattern and at least one transition permission pattern match.

On the other hand, when the monitor pattern and all the transition permission patterns do not match, the first comparator 40 proceeds to step S54. In such case, the monitor pattern can be regarded as abnormal. In such manner, the first comparator 40 determines that a predetermined correspondence relationship is satisfied when the monitor pattern and all the transition permission patterns do not match. Further, it can also be understood that the monitor pattern is not included in the transition permission pattern when the transition permission pattern and the monitor pattern do not match.

The drive device 100 of the sixth embodiment can exert the same effects as the drive device 100 of the first, second, and fifth embodiments. The load drive system 1000 of the sixth embodiment can exert the same effects as the load drive system 1000 of the first, second, and fifth embodiments.

Figure 23:
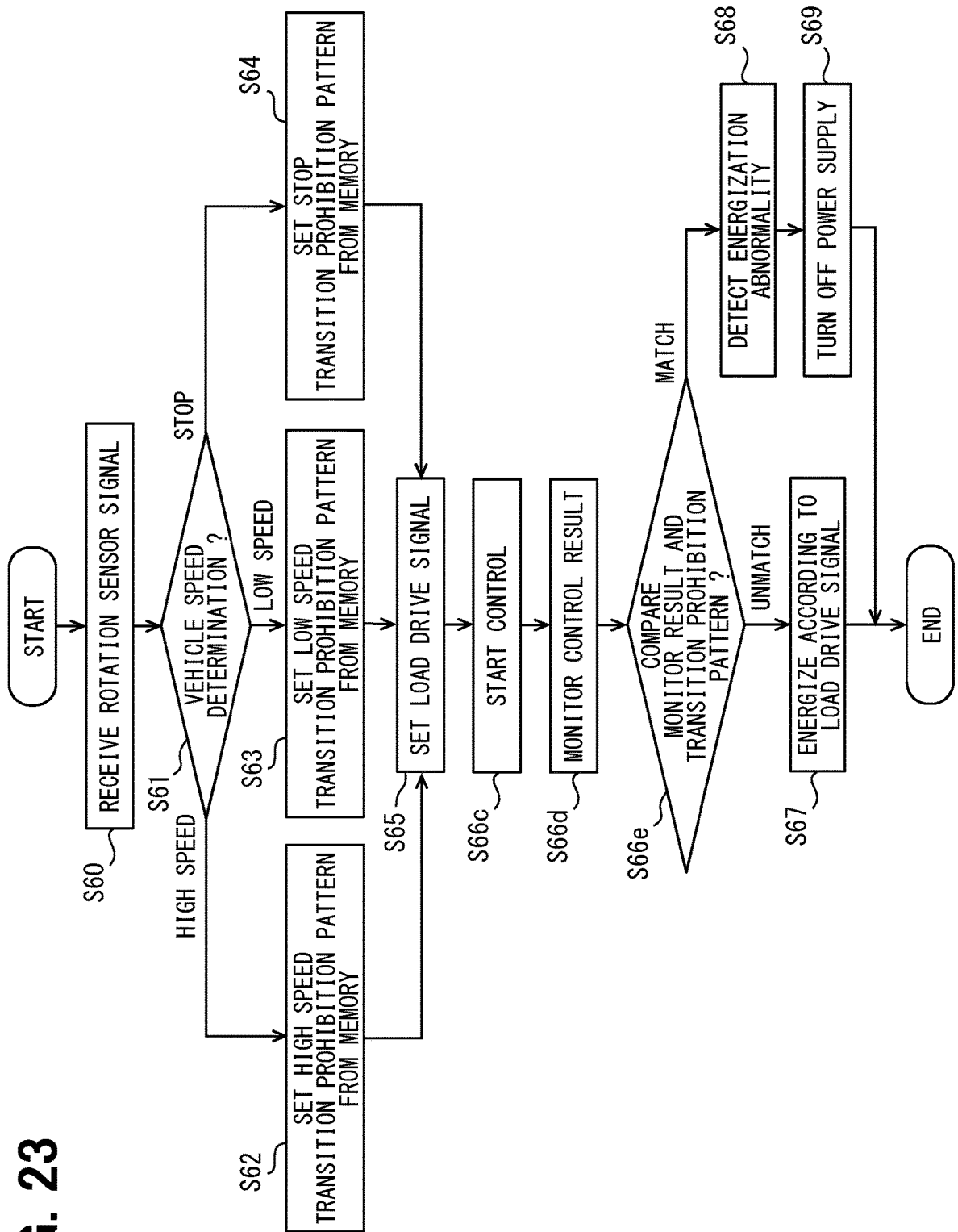
FIG. 23 is a flowchart showing the operation of the drive device in a seventh embodiment.

Seventh Embodiment, FIG. 23

The drive device 100 and the load drive system 1000 of the seventh embodiment are described with reference to FIG. 23. For example, the drive device 100 and the load drive system 1000 of the present embodiment have the same configuration as that of the first embodiment. Therefore, in the present embodiment, the same reference numerals are used for the same component or the same configuration as those in the first embodiment.

Similar to the third embodiment, the present embodiment uses the vehicle speed determined by the waveform analysis circuit 90 as the current drive state. Therefore, the drive device 100 of the present embodiment needs to include the waveform analysis circuit 90. Note that the transition prohibition pattern 52 of the present embodiment is the same as that of the third embodiment.

Further, in the present embodiment, as in the fifth embodiment, the monitor pattern is used as the correlated drive state. Therefore, the drive device 100 of the present embodiment needs to include the current detection resistor 81, the amplifier 82, the second comparator 83, and the monitor register 84.

Upon receiving the load drive signal, the drive device 100 starts the operation shown in a flowchart of FIG. 23. In FIG. 23, the same step number is assigned to the same process as in FIG. 19. Further, steps S66c to S66e are the same as steps S52c to S52e.

The drive device 100 of the seventh embodiment can exert the same effects as the drive device 100 of the first, third, and fifth embodiments. Further, the load drive system 1000 of the seventh embodiment can exert the same effects as the load drive system 1000 of the first, third, and fifth embodiments.

Figure 24:
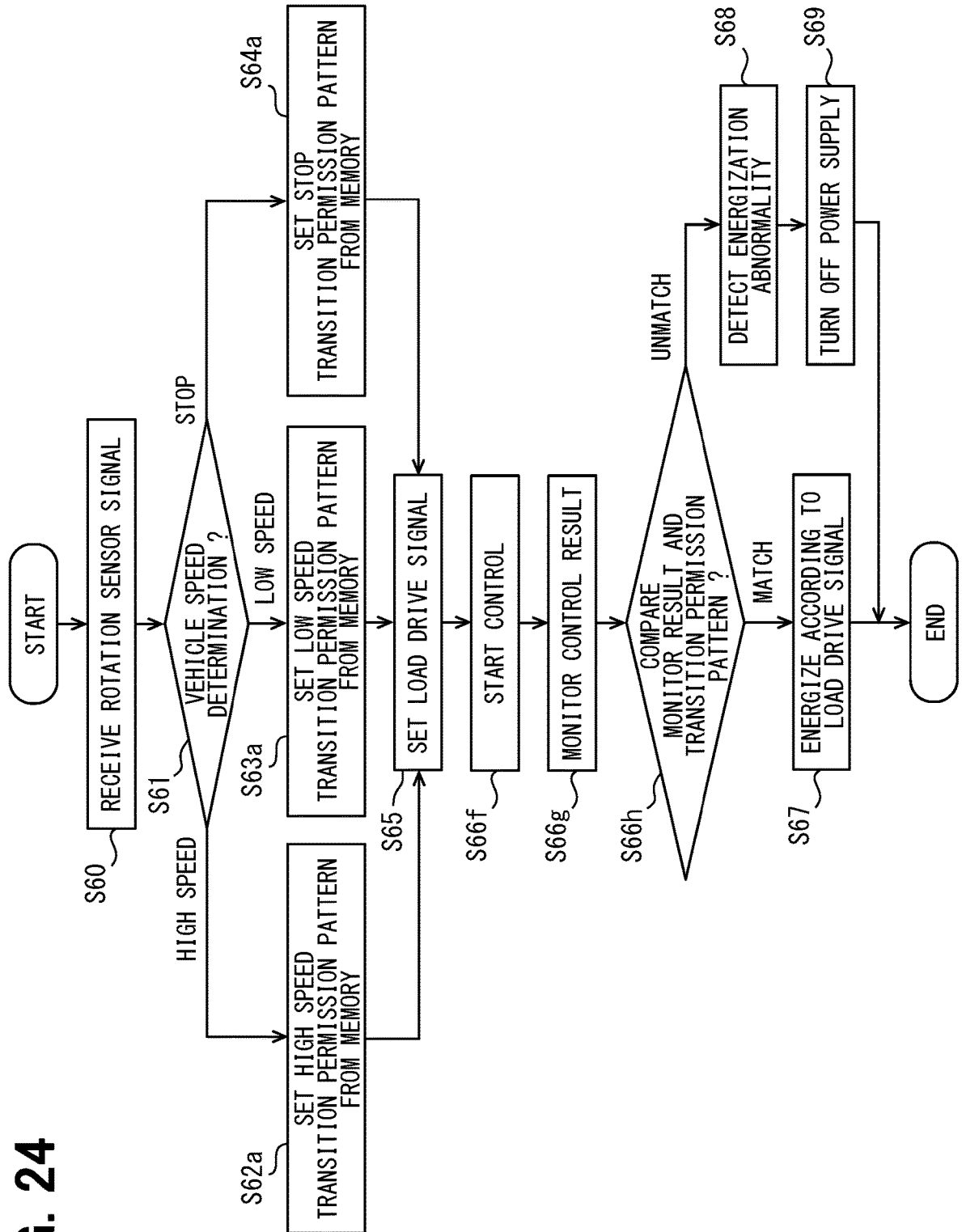
FIG. 24 is a flowchart showing the operation of the drive device in an eighth embodiment.

Eighth Embodiment, FIG. 24

The drive device 100 and the load drive system 1000 of the eighth embodiment are described with reference to FIG. 24. For example, the drive device 100 and the load drive system 1000 of the present embodiment have the same configuration as that of the first embodiment. Therefore, in the present embodiment, the same reference numerals are used for the same component or the same configuration as those in the first embodiment.

Similar to the fourth embodiment, the present embodiment uses the vehicle speed determined by the waveform analysis circuit 90 as the current drive state. Therefore, the drive device 100 of the present embodiment needs to include the waveform analysis circuit 90. The transition permission pattern of the present embodiment is the same as that of the fourth embodiment.

Further, in the present embodiment, as in the sixth embodiment, the monitor pattern is used as the correlated drive state. Therefore, the drive device 100 of the present embodiment needs to include the current detection resistor 81, the amplifier 82, the second comparator 83, and the monitor register 84.

Upon receiving the load drive signal, the drive device 100 starts the operation shown in a flowchart of FIG. 24. In FIG. 24, the same step number is assigned to the same process as in FIG. 20. Further, steps S66f to S66h are the same as steps S52f to S52h.

The drive device 100 of the eighth embodiment can exert the same effects as the drive device 100 of the first, fourth, and sixth embodiments. The load drive system 1000 of the eighth embodiment can exert the same effects as the load drive system 1000 of the first, fourth, and sixth embodiments.

Figure 25:
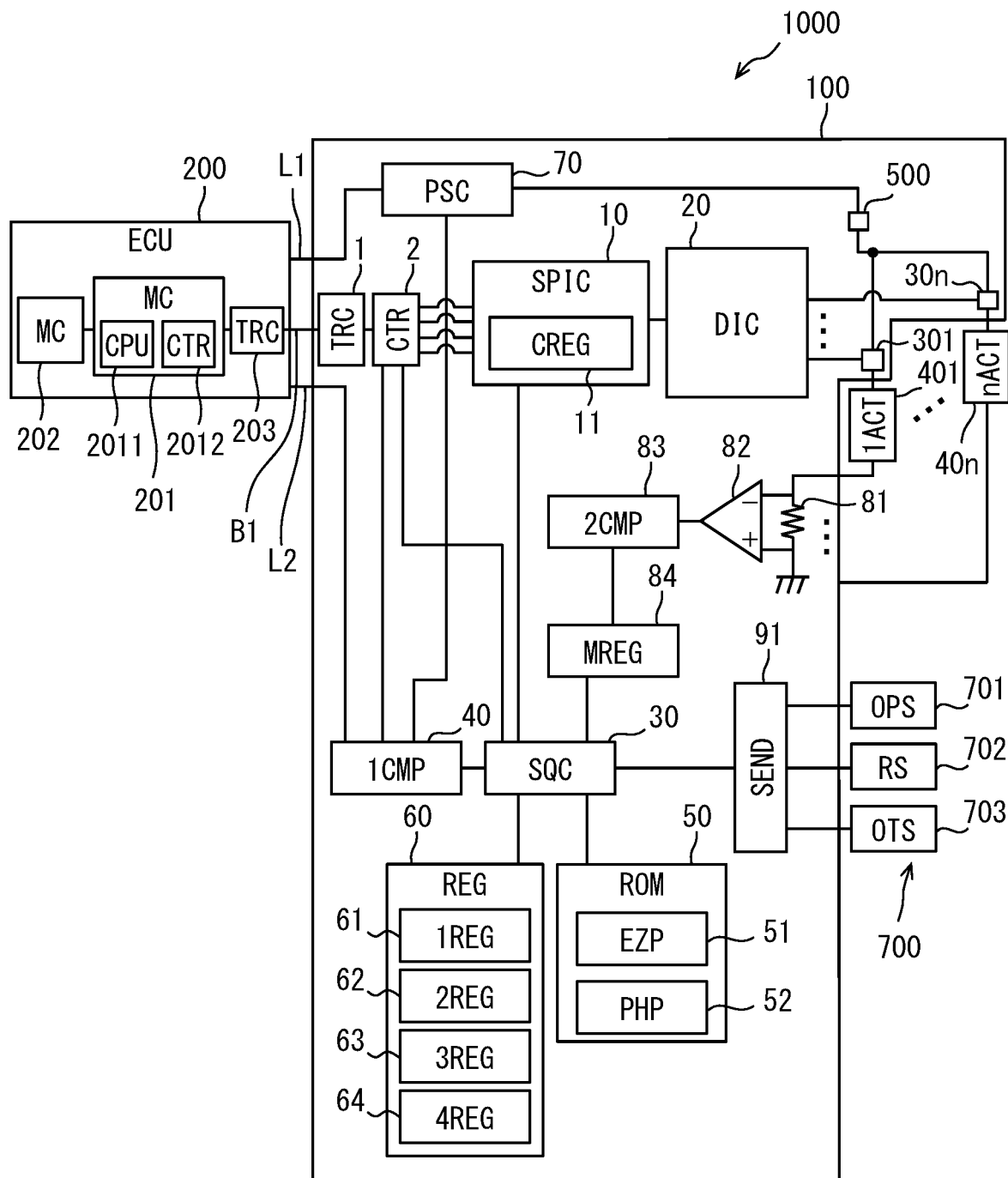
FIG. 25 is a circuit diagram showing a schematic configuration of the drive device in a ninth embodiment.
Figure 26:
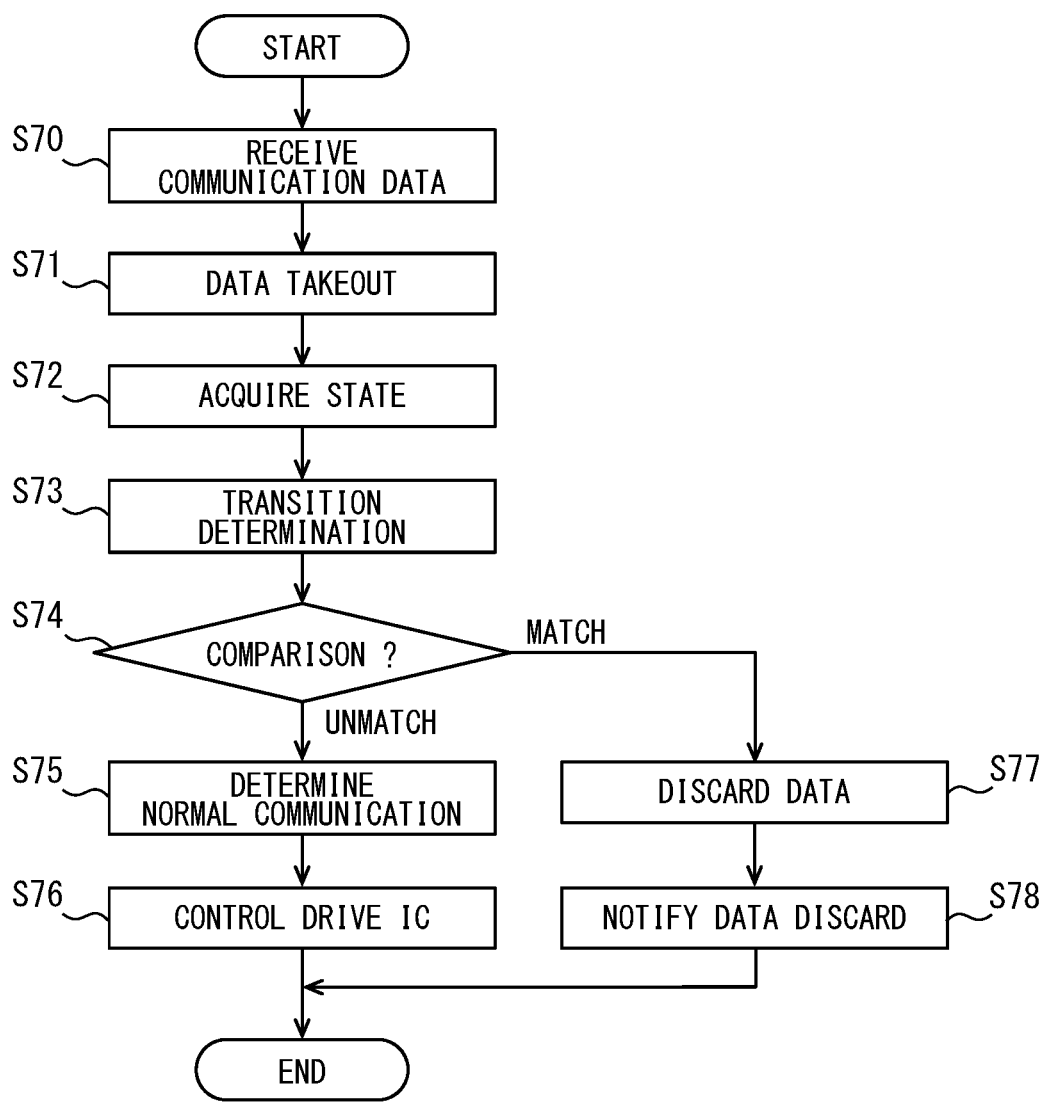
FIG. 26 is a flowchart showing the operation of the drive device in a ninth embodiment.
Figure 27:
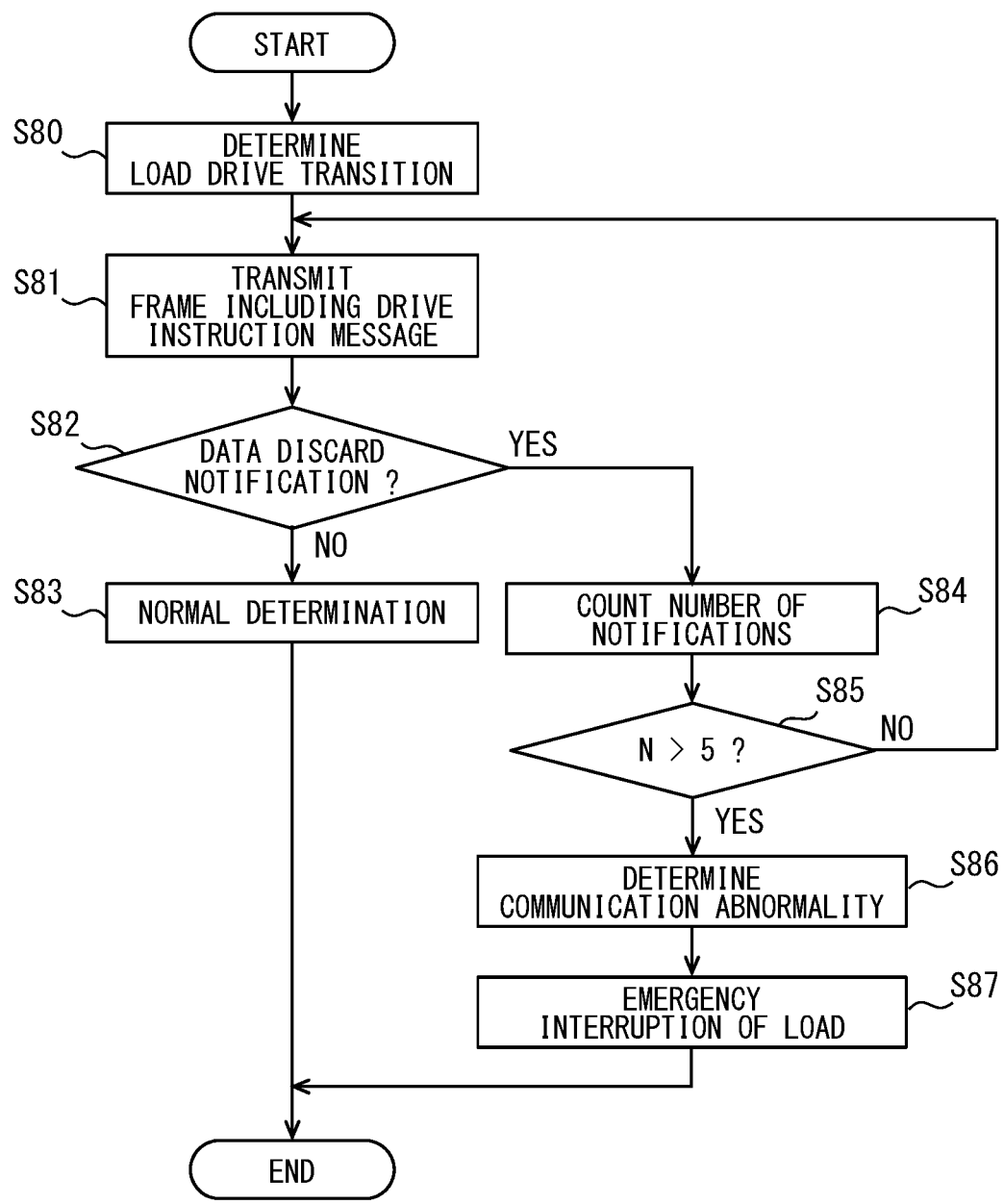
FIG. 27 is a flowchart showing the operation of the ECU in the ninth embodiment.

Ninth Embodiment, FIGS. 25-27

The drive device 100 and the load drive system 1000 of the ninth embodiment are described with reference to FIGS. 25, 26, and 27. The present embodiment is different from the first embodiment in that each of detection results of a sensor detection circuit 91 (SEND 91 in FIG. 25) is used as the current drive state instead of using the previous value of the control pattern. Further, the drive device 100 of the present embodiment is different from the drive device 100 of the first embodiment in that the sensor detection circuit 91 is provided. A sensor 700 is connected to the sensor detection circuit 91.

As shown in FIG. 25, the sensor 700 of the present embodiment includes an oil pressure sensor 701 (OPS), a rotation sensor 702 (RS), and an oil temperature sensor 703 (OTS). The oil pressure sensor 701 outputs a signal indicating the pressure of the hydraulic oil in the hydraulic circuit. The rotation sensor 702 is the same as the rotation sensor 600. The oil temperature sensor 703 outputs a signal indicating temperature of the hydraulic oil in the hydraulic circuit. The sensor 700 outputs an electric signal according to the drive state of the load.

The sensor detection circuit 91 (SEND) detects the signal of the sensor 700. The sensor detection circuit 91 performs predetermined processing, such as waveform detection, A/D conversion, and the like on the input signal from the sensor 700. The sensor detection circuit 91 detects the state of the load, that is, the state of the automatic transmission including the valve body. That is, the state of the automatic transmission including the valve body can be regarded as the current drive state, which is the current drive state of each of the actuators 40n. Similarly, each of the detection results of the sensor detection circuit 91 can be regarded as the current drive state. The sensor detection circuit 91 can also be understood as an acquisition device.

Each of the detection results of the sensor detection circuit 91 can be represented by, for example, 0 and 1. The sensor detection circuit 91 outputs each of the detection results to the sequence circuit 30. Further, the sensor detection circuit 91 may write each of the detection results in the monitor register 84.

Each of the detection results and the transition prohibition pattern 52 are associated and stored in the ROM 50. Further, instead of storing the transition prohibition pattern 52, the transition permission pattern may be stored in the ROM 50 in association with each of the detection results. Here, as an example, the transition prohibition pattern 52 is adopted.

The drive device 100 starts an operation shown in a flowchart of FIG. 26 at predetermined time intervals.

In step S70, communication data is received. The CAN controller 2 receives a frame from the communication bus B1 via the CAN transceiver 1. The CAN controller 2 extracts received messages and the like, and stores the received messages in a message box in order.

In step S71, data is taken out. The CAN controller 2 takes out data indicating a load drive signal from the message box. The CAN controller 2 stores data indicating the extracted load drive signal in a register. The data indicating the load drive signal stored in the register can also be understood as the update value of the control pattern. The sequence circuit 30 sets the update value of the control pattern in the first data register 61.

In step S72, the state is acquired. The sequence circuit 30 sets the previous value of the control pattern stored in the control register 11 in the second data register 62.

In step S73, transition is determined. The sequence circuit 30 determines the drive transition from the update value of the control pattern taken out in step S71 and the previous value of the control pattern acquired in step S72. That is, the sequence circuit 30 determines the drive transition from the current drive state to the drive state indicated by the update value of the control pattern.

As shown in FIG. 16, the sequence circuit 30 determines the drive transition by generating a transition pattern in which the update value of the control pattern and the previous value of the control pattern are combined. In such case, as shown in FIG. 16, the sequence circuit 30 sets the transition prohibition pattern 52 corresponding to the transition pattern in the fourth data register 64.

In step S74, comparison is performed. The first comparator 40 compares the transition pattern with the transition prohibition pattern 52. The first comparator 40 proceeds to step S75 when the transition pattern and all the transition prohibition patterns 52 do not match. In such case, the update value of the control pattern can be regarded as normal.

On the other hand, when the transition pattern and the transition prohibition pattern 52 match, the first comparator 40 proceeds to step S77. That is, even when only one of the transition prohibition patterns 52 matches the update value of the control pattern, the first comparator 40 proceeds to step S77. In such case, the update value of the control pattern can be regarded as abnormal.

In step S75, it is determined that the communication is normal. The first comparator 40 determines that the communication is normal. At such timing, the first comparator 40 may output a normal signal to the ECU 200 via the second signal line L2.

In step S76, the drive IC 20 is controlled. Step S76 is similar to step S53.

In step S77, data is discarded. As described above, the first comparator 40 outputs an abnormal signal indicating that the update value of the control pattern is abnormal to the CAN controller 2. When an abnormal signal is input, the CAN controller 2 discards the update value of the control pattern without outputting it to the SPI circuit 10. The CAN controller 2 discards the update value of the control pattern by not outputting the update value of the control pattern to the SPI circuit 10. Note that the CAN controller 2 may discard data by or as erasing the update value of the control pattern stored at timing when an abnormal signal is input.

As described above, the first comparator 40 outputs the abnormal signal to the CAN controller 2 so that the update value of the control pattern determined as abnormal is not stored in the control register 11. Therefore, in the drive device 100, the update value of the control pattern determined as abnormal is not written in the control register 11. Therefore, the drive device 100 can suppress the control of the drive of each of the actuators 40n by the update value of the control pattern determined as abnormal.

In step S78, the data discard is notified. The first comparator 40 outputs an abnormal signal to the ECU 200 via the second signal line L2. The abnormal signal is a signal that indicates that the update value of the control pattern is abnormal and that the data is discarded. The data here are the update value(s) of the control pattern. Further, in such way, in the drive device 100, the first comparator 40 outputs an abnormal signal without using a microcontroller or the like.

Note that the first comparator 40 does not have to output an abnormal signal to the power supply circuit 70. Further, steps S77 and S78 can be applied to other embodiments.

The operation of the ECU 200 is described. The ECU 200 starts an operation shown in a flowchart of FIG. 27 at predetermined time intervals. Note that steps S80 and S81 are the same as steps S10 and S12.

In step S82, it is determined whether or not there is a data discard notification. The CPU 2011 determines whether or not there is a data discard notification depending on whether or not the data discard notification is received from the drive device 100 via the second signal line L2. When the CPU 2011 receives the discard notification, it is determined that there is a discard notification, and proceeds to step S84, and when not receiving the discard notification, it is determined that there is no discard notification, and proceeds to step S83.

In step S83, a normal determination is made. The CPU 2011 determines that the communication with the drive device 100 is normal.

In step S84, notifications are counted. That is, the CPU 2011 counts the number of the discard notifications. Steps S85 to S87 are the same as steps S18 to S20.

The drive device 100 of the ninth embodiment can exert the same effects as the drive device 100 of the first embodiment. Further, the load drive system 1000 of the ninth embodiment can exert the same effects as the load drive system 1000 of the first embodiment. Further, the load drive system 1000 of the ninth embodiment can control the ECU 200 to put each of the actuators 40n in a power supply interrupted state when a communication abnormality occurs. Therefore, in the load drive system 1000 of the ninth embodiment, the drive device 100 can have a simplified configuration, i.e., can have a simpler configuration than the above.

Figure 28:
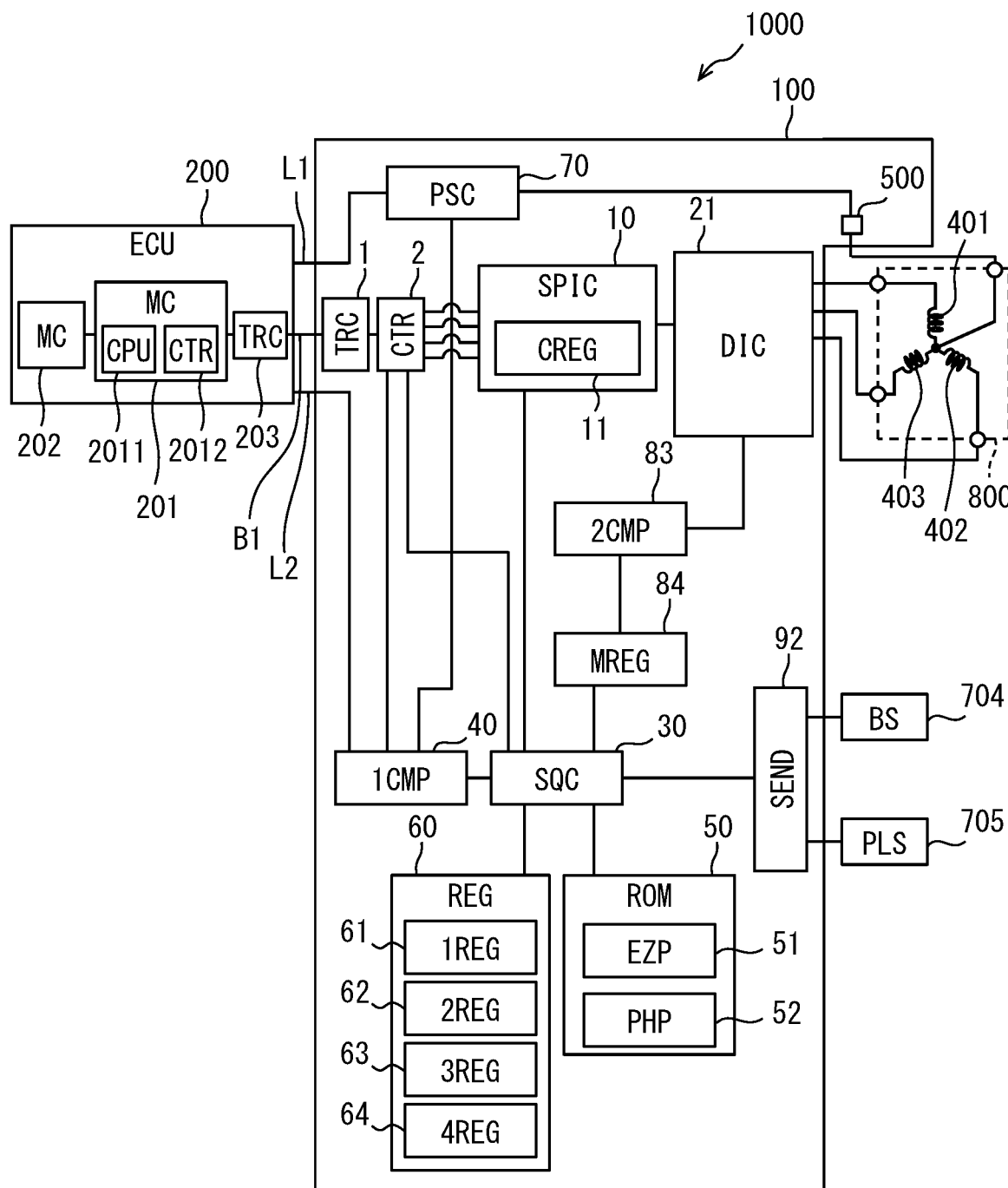
FIG. 28 is a circuit diagram showing a schematic configuration of a drive device in a tenth embodiment.

Tenth Embodiment, FIG. 28

The drive device 100 and the load drive system 1000 of the tenth embodiment are described with reference to FIG. 28. In the present embodiment, for convenience, the same reference numerals as those in the first embodiment are used.

The drive device 100 of the tenth embodiment is different from the above embodiment in that a motor 800 in a shift-by-wire system is driven and controlled. Therefore, the actuators 401 to 403 can also be understood as a U-phase winding, a V-phase winding, and a W-phase winding of the motor 800.

The drive device 100 of the present embodiment is different from the drive device 100 of the first embodiment in that it includes a sensor detection circuit 92. The present embodiment is different from the first embodiment in that each of the detection results of the sensor detection circuit 92 is used as the current drive state instead of using the previous value of the control pattern. The present embodiment is different from the first embodiment in that the transition determination value is a value that correlates with the drive transition from the current drive state and the current vehicle state.

The present embodiment is different from the first embodiment in that a drive state signal in the load drive signal indicating the drive state of the actuators 401 to 403 is written in the (relevant) address bits of the control register 11. In the present embodiment, the update value of the control pattern itself is adopted as the correlated drive state of each of the actuators 401 to 408 correlating with the update value of the control pattern stored in the control register 11.

In addition to the motor 800, the shift-by-wire system includes a parking lock (P-lock) mechanism, a shift range switching mechanism, and the like. The motor 800 rotates by receiving a supply of the electric power from a battery mounted on a vehicle (not shown), and functions as a driving power source (i.e., physical power) of the shift range switching mechanism. In the motor 800, the electric current can be supplied to each of the actuators 40n by turning ON the power supply switch 500. When the power supply switch 500 is turned OFF, the supply of the electric current to each of the actuators 40n is interrupted.

As the update value of the control pattern, for example, one indicating a release of the P lock can be adopted. That is, the ECU 200 has or outputs not only a signal instructing the rotation of the motor 800 but also a signal instructing the release of the P lock, as the load drive signal for the drive device 100.

The sensor of the present embodiment has a brake switch 704 and a P-lock sensor 705. The brake switch 704 (BS) outputs a signal indicating whether a brake pedal is depressed or not. Further, the brake switch 704 may output a signal according to an amount of depression of the brake pedal. The P-lock sensor 705 (PLS) outputs a signal indicating whether the P-lock is in a locked state or an unlocked state.

The sensor detection circuit 92 (SEND) detects the signal of the sensor 700. The sensor detection circuit 92 performs predetermined processing on an input signal from the sensor 700, such as waveform detection, A/D conversion and the like. The sensor detection circuit 92 detects a state of the load, that is, a state of the shift-by-wire system. That is, the state of the shift-by-wire system can be regarded as the current drive state, which is the current drive state of each of the actuators 40n. Similarly, the detection result of the sensor detection circuit 92 can be regarded as the current drive state. Further, the sensor detection circuit 92 detects the depressed state of the brake pedal of the vehicle. The state in which the brake pedal of the vehicle is depressed can be regarded as the vehicle state. The sensor detection circuit 92 can also be understood as an acquisition unit.

Each of the detection results of the sensor detection circuit 92 can be represented by, for example, 0 and 1. The sensor detection circuit 92 outputs each of the detection results to the sequence circuit 30. Further, the sensor detection circuit 92 may write each of the detection results in the monitor register 84.

Each of the detection results of the sensor detection circuit 92 and the transition prohibition pattern 52 are associated and are stored in the ROM 50. That is, the transition prohibition pattern 52 is associated with the current drive state and the current vehicle state. Further, instead of storing the transition prohibition pattern 52, the transition permission pattern may be stored in the ROM 50 in association with each of the detection results. Here, as an example, the transition prohibition pattern 52 is adopted.

The sequence circuit 30 determines the current drive state and the current vehicle state based on each of the detection results. Further, the sequence circuit 30 sets the transition prohibition pattern 52 associated with each of the detection results in the fourth data register 64. As the transition prohibition pattern 52, regarding a state in which the P lock is locked and the brake pedal is not depressed, for example, an update value of a control pattern indicating release of the P lock can be adopted.

The first comparator 40 compares the update value of the control pattern with the transition prohibition pattern 52, as in the above embodiment. The first comparator 40 determines that it is abnormal when the update value of the control pattern and the transition prohibition pattern 52 match, and determines that it is normal when they do not match.

The drive device 100 of the tenth embodiment can exert the same effects as the drive device 100 of the first embodiment. The load drive system 1000 of the tenth embodiment can exert the same effects as the load drive system 1000 of the first embodiment.

What is claimed is:

1. A load drive system for driving a load comprising
a load control device, a load drive device, a communication bus to which the load control device and the load drive device are connected, and a signal line that is different from the communication bus to which the load control device and the load drive device are connected, wherein
the load control device includes a transmitter that transmits messages, including drive information indicating a drive state of the load, to the load drive device via the communication bus, and
the load drive device includes:
a receiver that receives a message via the communication bus,
a driver that drives the load based on the drive information included in the message received by the receiver, and
a notifier that extracts the drive information from the received message and notifies the extracted drive information to the load control device via the signal line.

2. The load drive system of claim 1, wherein
the notifier notifies the load control device of the extracted drive information via the signal line before the driver drives the load.

3. The load drive system of claim 1, wherein
the load control device includes:
an acquisition unit that acquires the drive information via the signal line,
a comparison unit that compares the drive information transmitted from the transmitter against the drive information acquired by the acquisition unit,
an abnormality determination unit that, upon a determination that the drive information transmitted from the transmitter and the drive information acquired by the acquisition unit do not satisfy a predetermined correspondence relationship, finds (i) that the drive information acquired by the acquisition unit is abnormal, and (ii) that the load drive device is in a state in which the load is abnormally driven.

4. The load drive system of claim 3, wherein
the load control device includes an abnormality handling unit that sets the load in an abnormality handling state when the abnormality determination unit determines that the load drive device is in a state in which the load is abnormally driven.

5. The load drive system of claim 3, wherein
the load control device includes a drive permission unit that
(a) prohibits drive of the load until the abnormality determination unit determines that the load is not in a state of being abnormally driven, and
(b) transmits a drive permission signal indicating permission of drive of the load when the abnormality determination unit determines that the load is not in a state of being abnormally driven.

6. The load drive system of claim 1, wherein
the notifier (i) converts the extracted drive information into a load drive signal that is used when the driver drives the load and that has a smaller amount of data than data of the drive information, and (ii) notifies the load control device using the load drive signal.

7. The load drive system of claim 1, wherein
the load drive device
(a) has, connected thereto, a sensor that outputs an electric signal according to the drive state of the load, and
(b) transmits the electric signal output from the sensor to the load control device via the communication bus.

8. The load drive system of claim 1, wherein
the notifier notifies the load control device of the extracted drive information as a duty of a pulse signal via the signal line.

9. A load drive system comprising:
a control device including:
 (i) a first microcontroller including a first processor and a first non-transitory computer-readable medium, and
 (ii) a control transceiver;
a drive device including:
 (i) a drive transceiver,
 (ii) a power supply circuit,
 (iii) a drive controller, and
 (iv) a first comparator,
a communication bus connecting the control transceiver to the drive transceiver;
a first signal line that:
 (i) is independent from the communication bus, and
 (ii) connects the control device to the power supply circuit;
a second signal line that:
 (i) is independent from the communication bus,
 (ii) is independent from the first signal line, and
 (iii) connects the control device to the first comparator; and
a third signal line that:
 (i) is independent from the communication bus,
 (ii) is independent from the first signal line,
 (iii) is independent from the second signal line, and
 (iv) connects the control device to the drive controller.

10. The load drive system of claim 9, wherein the control device is configured to:
determine a load drive transition;
drive a prohibited state by:
 (i) NOT sending a drive permission signal through the third signal line to the drive controller, or
 (ii) sending a drive prohibition signal through the third signal line to the drive controller;
send a drive instruction message through the communication bus to the drive controller, wherein the drive instruction message is associated with a load drive signal;
receive the load drive signal, through the third signal line, from the drive controller;
compare the received load drive signal to the sent drive instruction message; and
upon a determination that the received load drive signal matches the sent drive instruction message, drive a permitted state by:
 (i) sending the drive permission signal through the third signal line to the drive controller, or
 (ii) NOT sending the drive prohibition signal through the third signal line to the drive controller.

11. The load drive system of claim 10, wherein the control device is further configured to:
upon a determination that the received load drive signal does not match the sent drive instruction message, perform the following:
 (i) increment a count number of unmatch determinations, and
 (ii) determine whether the incremented count number exceeds a count number threshold.

12. The load drive system of claim 11, wherein the control device is further configured to:
upon a determination that the incremented count number exceeds the count number threshold:
 (i) determine that a communication abnormality exists, and
 (ii) send an emergency interrupt instruction, through the first signal line, to the power supply circuit.

13. The load drive system of claim 9, wherein the first comparator is configured to:
receive a transition prohibition pattern associated with a load drive signal;
receive the load drive signal;
compare the transition prohibition pattern against the load drive signal;
upon a determination that the transition prohibition pattern matches the load drive signal, perform at least one of the following:
 (i) send an energization abnormality notification, through the second signal line, to the control device, and
 (ii) turn OFF the power supply circuit through an internal signal line,
wherein the internal signal line is independent of: the communication bus, the first signal line, the second signal line, and the third signal line.

14. A load drive system comprising:
a control device including:
 (i) a first microcontroller including a first processor and a first non-transitory computer-readable medium, and
 (ii) a control transceiver;
a drive device including:
 (i) a drive transceiver,
 (ii) a power supply circuit,
 (iii) a drive controller, and
 (iv) a first comparator;
a communication bus connecting the control transceiver to the drive transceiver; and
a drive controller signal line that:
 (i) is independent from the communication bus, and
 (ii) connects the control device to the drive controller.

15. The load drive system of claim 14, wherein the control device is configured to:
- determine a load drive transition;
- drive a prohibited state by:
  - (i) NOT sending a drive permission signal through the drive controller signal line to the drive controller, or
  - (ii) sending a drive prohibition signal through the drive controller signal line to the drive controller;
- send a drive instruction message through the communication bus to the drive controller, wherein the drive instruction message is associated with a load drive signal;
- receive the load drive signal, through the drive controller signal line, from the drive controller;
- compare the received load drive signal to the sent drive instruction message; and
- upon a determination that the received load drive signal matches the sent drive instruction message, drive a permitted state by:
  - (i) sending the drive permission signal through the drive controller signal line to the drive controller, or
  - (ii) NOT sending the drive prohibition signal through the drive controller signal line to the drive controller.

* * * * *